United States Patent
Guilley et al.

(10) Patent No.: US 10,331,912 B2
(45) Date of Patent: Jun. 25, 2019

(54) CIRCUIT PROTECTION SYSTEM AND METHOD

(71) Applicant: SECURE-IC SAS, Cesson-Sévigné (FR)

(72) Inventors: Sylvain Guilley, Paris (FR); Thibaut Porteboeuf, Paris (FR); Jean-Luc Danger, Antony (FR)

(73) Assignee: SECURE-IC SAS, Cesson-Sévigné (FR)

( * ) Notice: Subject to any disclaimer, the term of this patent is extended or adjusted under 35 U.S.C. 154(b) by 378 days.

(21) Appl. No.: 15/501,480

(22) PCT Filed: Jul. 30, 2015

(86) PCT No.: PCT/EP2015/067560
§ 371 (c)(1),
(2) Date: Feb. 3, 2017

(87) PCT Pub. No.: WO2016/020267
PCT Pub. Date: Feb. 11, 2016

(65) Prior Publication Data
US 2017/0228562 A1      Aug. 10, 2017

(30) Foreign Application Priority Data

Aug. 6, 2014     (EP) .................................... 14306247

(51) Int. Cl.
*G09C 1/00*     (2006.01)
*H04L 9/00*     (2006.01)
(Continued)

(52) U.S. Cl.
CPC .............. *G06F 21/75* (2013.01); *G06F 11/22* (2013.01); *G06F 11/263* (2013.01); *G06F 21/56* (2013.01);
(Continued)

(58) Field of Classification Search
CPC ........ G06F 11/22; G06F 11/263; G06F 21/56; G06F 21/577
See application file for complete search history.

(56) References Cited

U.S. PATENT DOCUMENTS 6,131,078 A * 10/2000 Plaisted .................. G06F 17/10
703/2
7,994,042 B2     8/2011 Hsu et al.
(Continued)

OTHER PUBLICATIONS

International Search Report for PCT/EP2015/067560, dated Oct. 8, 2015.
(Continued)

*Primary Examiner* — Jigar P Patel
(74) *Attorney, Agent, or Firm* — Meagher Emanuel Laks Goldberg & Liao, LLP

(57) ABSTRACT

The invention proposes a method of protection of a Boolean circuit associated with a structural description of the circuit comprising elementary Boolean variables, each represented by one bit, the method comprising the steps consisting in:
selecting a set of k elementary Boolean variables of the circuit as a function of predefined selection criteria,
constructing a variable x represented by k bits by concatenation of the k selected variables in accordance with a chosen order,
determining a binary code C comprising a set of code words and belonging to a given vector space and the supplementary code D of said binary code C as a function of a condition bearing on the dual distance of said supplementary code D, said binary code C having a length n and a size $2^k$, where k designates the number of bits representing said variable x;
substituting the variable x in the structural description of the Boolean circuit with a protected variable z represented by n bits so that:
(Continued)

any operation of writing on the variable x in the circuit is substituted with an operation of writing on the variable z, the variable z being generated by adding the variable x encoded by said code C to a random bit vector y encoded by the supplementary code D, and any operation of reading the variable x in the circuit is substituted with an operation of reading the value of the protected variable z and an operation of decoding said read value of the protected variable z using a decoding matrix J of size (n×k) determined from the binary code C and the supplementary code D of the binary code C.

15 Claims, 14 Drawing Sheets

(51) Int. Cl.
| | |
|---|---|
| *G06F 11/22* | (2006.01) |
| *G06F 21/55* | (2013.01) |
| *G06F 21/56* | (2013.01) |
| *G06F 21/71* | (2013.01) |
| *G06F 21/75* | (2013.01) |
| *G06F 11/263* | (2006.01) |

(52) U.S. Cl.
CPC ............... *G06F 21/71* (2013.01); *G09C 1/00* (2013.01); *H04L 9/002* (2013.01); *G06F 21/55* (2013.01); *G06F 2221/034* (2013.01); *H04L 2209/046* (2013.01); *H04L 2209/12* (2013.01)

(56) References Cited

U.S. PATENT DOCUMENTS

| | | | |
|---|---|---|---|
| 2003/0115522 A1* | 6/2003 | Nadeau-Dostie | ............................ G01R 31/3004 714/726 |
| 2003/0236774 A1* | 12/2003 | Andreev | ............. G06F 17/5045 |
| 2011/0078640 A1* | 3/2011 | Bruneel | ............. G06F 17/5054 716/102 |
| 2013/0198705 A1* | 8/2013 | Janssen | ................ G06F 17/504 716/111 |

OTHER PUBLICATIONS

Written Opinion for PCT/EP2015/067560, dated Oct. 8, 2015.
Bringer, Julien et al., "Orthogonal Direct Sum Masking", Lectures Notes in Computer Science, Jun. 30, 2014 (Jun. 30, 2014), vol. 8501, pp. 40-56, Springer Berlin Heidelberg, Berlin.
Bhasin, Shivam et al., "Hardware Trojan Horses in Cryptographic IP Cores", 2013 Workshop on Fault Diagnosis an Tolerance in Cryptography, IEEE, Aug. 20, 2013 (Aug. 20, 2013), pp. 15-29.
Abramovici, M. et al., "Integrated circuit security: new threats and solutions", 5th Annual Workshop on Cyber Security and Information Intelligence Research 2009 (CSIIRW 09) : Oak Ridge (and Knoxville), Tennessee, USA, Apr. 13-15, 2009, Curran, Red Hook, NY, Apr. 13, 2009 (Apr. 13, 2009), pp. 1-3.
Randy Torrance and Dick James. "The State-of-the-Art in IC Reverse Engineering", In CHES, vol. 5747 of LNCS, pp. 363-381. Springer, Sep. 6-9, 2009. Lausanne, Switzerland.
M. Banga and M.S. Hsiao. "ODETTE: A Non-Scan Design-for-Test Methodology for Trojan Detection in ICs". In International Workshop on Hardware-Oriented Security and Trust (HOST), IEEE, pp. 18-23, 2011.
Jarrod A. Roy, Farinaz Koushanfar, and Igor L. Markov. "EPIC: Ending Piracy of Integrated Circuits". In DATE, pp. 1069-1074. IEEE, 2008.
A. Samad Hedayat, Neil James Alexander Sloane, and John Stufken. Orthogonal Arrays, Theory and Applications. Springer series in statistics. Springer, New York, 1999. Chapter 12, pp. 317-327, ISBN 978-0-387-98766-8.

* cited by examiner

CIRCUIT PROTECTION SYSTEM AND METHOD

TECHNICAL FIELD

The present invention is generally concerned with electronic circuits and in particular systems and methods for protecting such electronic circuits.

PRIOR ART

The fabrication of electronic components necessitates extremely complex processes. Moreover, the fabrication of such components necessitates a complex and costly infrastructure, such as foundry type factories for manufacturing the electronic circuits of these electronic components, generally from silicon and using masks. It has in particular been observed that the more developed the technology of the electronic components, the smaller the number of factories required for their fabrication. Such factories in small numbers must then function with strong constraints so as to be able to process the different types of electronic components that are entrusted to them, such as availability and production throughput constraints, for example. It then becomes difficult to choose a particular foundry. To optimise the fabrication costs of the electronic components by minimising these constraints (for example in terms of delay), it may be necessary to have the components fabricated in other geographical areas. In some technology sectors such a choice may be limited by the absence or guarantees offered by the foundry and in particular the impossibility of being sure that the foundry operator has no malicious intent in the context of the fabrication of the electronic components. For example, it is difficult to check if the foundry:
  produces more samples than requested in order to sell them on a grey market (this is the concept known as overbuilding);
  copies the blueprints of the electronic components in order to resell them;
  modifies the blueprints of the electronic circuits before fabricating them (known as counterfeiting).
Modification of the electronic circuits is a particularly sensitive threat. A number of motivations may lead a foundry to modify such blueprints maliciously, such as, for example:
  to make the circuits intentionally perform less well than those of a competitor;
  to insert a "back door" in order to provide remote access or simply to filter out information in a discreet manner;
  to insert logic enabling remote destruction of the component (known as a kill switch).
Such malicious modifications of an electronic circuit are generally referred to as a hardware Trojan horse. A Trojan horse comprises two parts:
  1. an activation part (trigger), which spies on the state of the circuit to deduce therefrom a condition for triggering the Trojan horse, and
  2. an action part (payload) that executes the malicious action after triggering.
To execute its malicious action, a Trojan horse must have simultaneous access to the two functional parts comprising the trigger and the payload.
By extension, Trojan horse trapping concerns as much the masks of ASIC (Application Specific Integrated Circuits) and FPGA (Field Programmable Gate Array) configuration files as processor binary machine codes.

There are two classic approaches to combating Trojan horses. The first or proactive approach consists in preventing insertion whereas the second or reactive approach consists in detecting insertion.

The reactive approach is a palliative solution in that it is based on the supposition that a Trojan horse has in fact been successfully introduced into the circuit. Its reliability is also difficult to quantify.

In fact, false positives (detection of a Trojan horse that in reality does not exist) and false negatives (non-detection of a Trojan horse that in reality does exist, for example if it is sufficiently discreet) can occur.

It is equally possible that some samples of the same electronic component are fabricated with a Trojan horse while other samples of the electronic component are fabricated with no Trojan horse, which can be possible, for example, if the overall masks feature only one or a few counterfeited dies. If the detection tests are not exhaustive, but applied on a case by case basis (this method is referred to as screening), it is possible for infected samples to circumvent the filters.

Some existing detection methods are directly onboard the component: this is then referred to as a monitor. It is also possible to reverse engineer the component entirely and to verify the integrity of the blueprints, as described for example in Randy Torrance and Dick James. The State-of-the-Art in IC Reverse Engineering, In CHES, volume 5747 of LNCS, pages 363-381. Springer, Sep. 6-9, 2009. Lausanne, Switzerland. However, such a study by reverse engineering the component can prove particularly lengthy and complex if the circuit contains several million gates, which makes it very costly.

Other known detection methods use logic tests, such as, for example, the method described in M. Banga and M. S. Hsiao. ODETTE: A Non-Scan Design-for-Test Methodology for Trojan Detection in ICs. In International Workshop on Hardware-Oriented Security and Trust (HOST), IEEE, pages 18-23, 2011. This paper describes the production of a logic chain (similar to a scan chain) that is always activated in that it is connected to the Q output of the latches D when the complemented output $\bar{Q}$ is taken, and vice versa. Such a detection method makes it possible to have two functionalities (a required functionality, then a verification functionality) that are correlated. A modification of the specifications of the circuit can therefore be detected via the verification functionality. Physical observation techniques have also been suggested, such as imaging or measuring physical quantities that would betray the presence of a Trojan horse (propagation time in logic paths, electromagnetic emissions, photon emission, etc.). In such approaches, to obtain a satisfactory detection capacity, it is necessary to have available a healthy reference sample to carry out difference measurements, which renders the approach more complex and costly.

By preventing insertion, the proactive approach makes it possible to remedy some drawbacks of the reactive approach. Various solutions have been proposed for preventing Trojan horse insertion. One known prevention solution consists in using a design process that gives the foundry only a portion of the information on the electronic component, this portion being sufficiently limited to prevent the hacker from designing a useful Trojan horse, such as, for example:
  a process consisting in fabricating a portion of the component in a given foundry, then the other portion of the component in another foundry (this method is known as split foundries);

a method based on the use of a programmable memory (such as FPGA type reconfigurable areas or memories) for the implementation of some parts of the component, which makes it possible to program critical parts after fabrication, without disclosing them to the foundry (Jarrod A. Roy, Farinaz Koushanfar, and Igor L. Markov. EPIC: Ending Piracy of Integrated Circuits. In DATE, pages 1069-1074. IEEE, 2008).

However, using two foundries is specific to the fabrication of masks for dedicated circuits of ASIC (Application Specific Integrated Circuit) type, induces high logistical costs and reduces production efficiency.

Moreover, although the use of a memory to be configured after fabrication makes it possible to render the functionality dependent on a key, it leads to a high additional cost: it is estimated that an FPGA type reprogrammable area is 40 times larger than a dedicated area. Moreover, for the right key, the circuit assumes a functional semantic. This method is therefore not protected from a static analysis of the partial structure of the electric circuit (known as a netlist). Powerful tools, such as SAT-solvers and SMT, have been developed to solve such Boolean problems. Unlike cryptographic keys, none of which is distinguished, in theory, the same does not apply to the countermeasure employing subtraction of information from the component during its fabrication. Moreover, this protection is static, i.e. there is nothing to prevent a hacker from probing the missing configuration once the component has been customised.

Another prevention solution consists in effecting a high-density placement, which makes it difficult to insert large Trojan horses (Shivam Bhasin, Jean-Luc Danger, Sylvain Guilley, Xuan Thuy Ngo, and Laurent Sauvage. Hardware Trojan Horses in Cryptographic IP Cores. In Wieland Fischer and Jörn-Marc Schmidt, editors, FDTC, pages 15-29. IEEE, 2013).

Although such a solution based on an increase in the placement density makes inserting a large Trojan horse more complicated, it is possible in practice for a hacker to produce and to insert a sufficiently powerful Trojan horse into a target circuit, despite such a solution.

A further prevention solution is based on an obfuscation operation, such as the mixing of gates that leads to complex routing (known as spaghetti routing) or camouflage as described in US patent U.S. Pat. No. 7,994,042 B2.

These prevention techniques are based on the use of either manual design or automated design, such as the use of CAD (Computer-Aided Design) tools dedicated to the design of electronic circuits (known as Electronic Design Automation (EDA)). Such tools can be guided, for example via scripts, to implement such protection. Such tools are moreover suited to designing ASIC (Application Specific Integrated Circuit) type dedicated circuit masks. There also exist similar tools for the design of configuration files (bitstreams) of FPGA (Field Programmable Gate Array) type reconfigurable circuits and binary programs of software running on processors.

However, such Trojan horse insertion prevention techniques prove costly and/or relatively unprovable. In fact, obfuscation, like white box cryptography, is by its nature inherently not provable.

General Definition of the Invention

The invention comes to improve on the situation by proposing a Boolean circuit protection method as defined in claim 1 and a circuit protection system as defined in claim 15. Some preferred embodiments are described in claims 1 to 14.

The various embodiments of the invention therefore make it possible to remedy any attempt at espionage and/or circuit modification, offering a solution of relatively low cost that can be implemented by modifying the result of the logic synthesis (source code compilation) phase without impacting on the overall technology architecture. They also offer a provable and dynamic solution by virtue of the use of random numbers updated on each clock event.

BRIEF DESCRIPTION OF THE DRAWINGS

Other features and advantages of the invention will become apparent in the light of the following description and the appended figures, in which.

DETAILED DESCRIPTION

Figure 1:
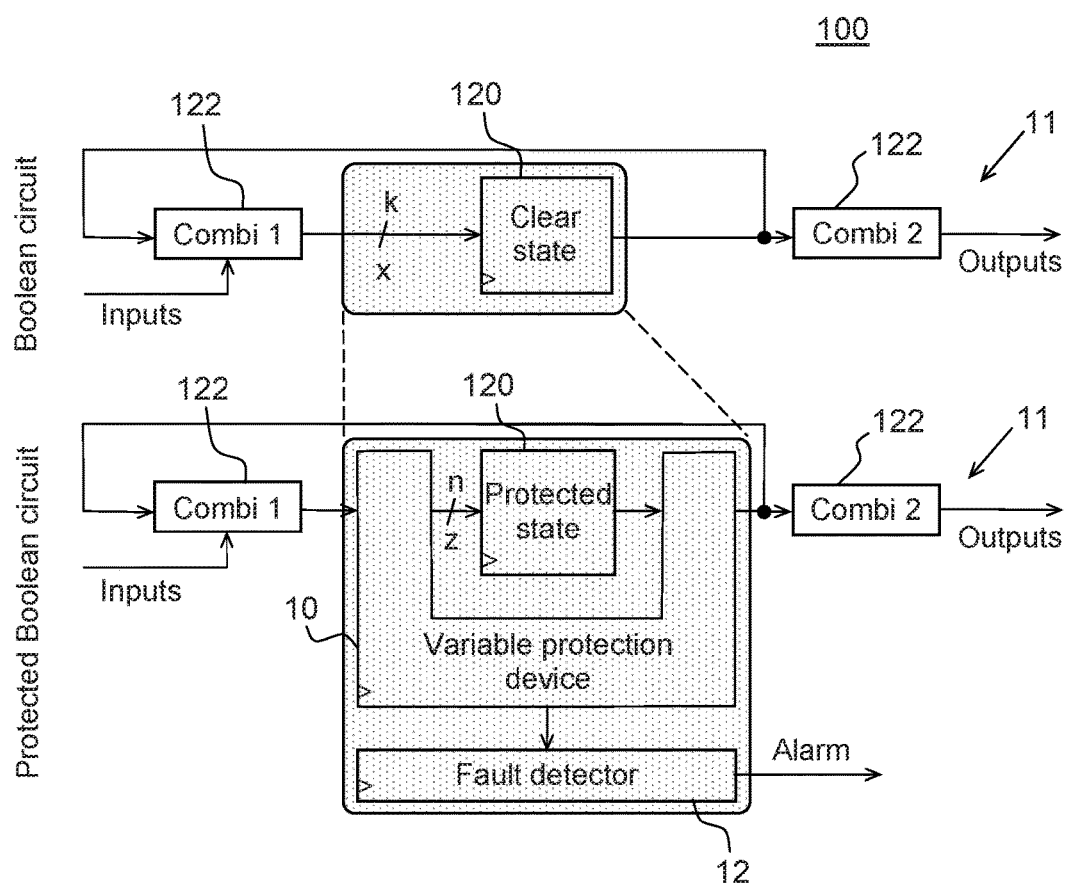
FIG. 1 is a diagrammatic representation of a circuit protection system in accordance with certain embodiments.

FIG. 1 shows diagrammatically a protection system 100 in accordance with certain embodiments for protecting an electronic circuit 11 intended to protect a circuit 11.

The protection system 100 comprises a variable protection device 10 comprising a set of circuit protection elements configured to protect one or more variables of the electronic circuit 11 in order to prevent the insertion of a malicious circuit, such as a Trojan horse, into the circuit 11.

The protection system 100 may further comprise a fault detector 12 comprising a set of detection circuit elements configured to detect a fault injected by a malicious circuit (for example a Trojan horse) to complete the protection of the circuit, for example in cases where the insertion of the malicious circuit cannot be prevented, and thereby to impede the functioning of the malicious circuit.

It should be noted that the FIG. 1 representation is a diagrammatic representation to facilitate understanding the invention. In practice, the elements of the variable protection device 10 and the elements of the detector 12 of the system 100 may be implemented directly on the circuit 11, by combination with certain components of the circuit.

The circuit 11 is a Boolean circuit generated from a binary structural description in which the variables of the circuit are represented by elementary Boolean variables, each represented by one bit.

The circuit 11 may be of any type, such as an ASIC, FPGA or CPU type circuit, for example.

For example, the Boolean circuit may be a synchronous digital circuit the sequential elements of which are timed by one and the same clock. On each clock event (for example each rising clock edge), the sequential elements (e.g. latches) sample their inputs which can therefore be copied to their output and thereafter processed by a combinational element before being resampled on the next clock pulse. In variant embodiments there may be a plurality of clock domains grouping together a set of sequential and combinational elements.

The remainder of the description refers mainly to such a synchronous digital circuit by way of non-limiting example.

Such a circuit 11 may comprise a set of logic gates 12 that it is possible to classify into two categories (the logic gates 12 are represented diagrammatically in FIG. 1):

Sequential gates 120, which store the state of the circuit (usually represented in block diagrams representing circuits by a box, such as a rectangle, with a small triangle on one face), and combinational gates 122 which carry out intermediate calculations: the values resulting from the intermediate calculations are not stored locally but transmitted to the sequential gates. In particular, the combinational logic implemented by the combinational gates is usually dedicated to two uses, namely a calculation on data and a check on calculations.

As is known in itself, the logic gates are connected by lines on which signals circulate. The connections between the various logic gates of a circuit 11 may be represented by a logic gate interconnection graph (netlist). The variables stored in a sequential gate correspond to the variables that the output line of the gate can carry.

A Trojan horse essentially targets the sequential gates because they contain the useful information of the circuit, such as cryptographic keys, identifiers, etc.

The sequential gates (also referred to hereinafter as sequential resources or registers) may generally comprise memory points, such as latches, but may equally comprise memories (SRAM, FLASH, etc.).

Moreover, the sequential gates are easily identifiable in a circuit by microscopic observation, because they generally have a specific shape (for example, a latch is much larger than a combinational gate), and are grouped together in a particular area of the circuit (corresponding to buses, the term bus designating a set of bits processed homogeneously as one or more bytes).

The sequential gates are moreover more easily intelligible than the combinational gates. In fact, they are present in small numbers and grouped together in connected areas, whereas the combinational gates are very numerous with the result that understanding their role is complex (based on a functional abstraction that entails semantic interpretation).

As used in the present description, the term variable designates a container capable of carrying data and associated with operations of reading and writing the data. This definition may correspond, for example, to a gate or a set of sequential logic gates of the circuit 11. Similarly, a line or a set of lines of the circuit 11 may also be designated by the term variable, reading and writing most often being effected by respectively measuring and modifying the voltage level carried by the line or lines.

The variables of the circuit stored in the sequential gates are designated hereinafter sequential variables. A sequential variable therefore represents an item of data contained in a sequential resource (sequential gate), i.e. stored data. Such sequential variables store the state of the calculation and their role in a circuit is particularly easy to interpret. Moreover, the registers and the memories are the logic gates easiest to recognise, because of their large size and their characteristic shape. The number of sequential resources therefore corresponds to the number of sequential variables.

A Trojan horse is a circuit (set of sequential and combinational gates) configured to be connected to signals from a source circuit 11 (host) to read and write data from the host for malicious purposes. Reading serves to trigger the Trojan horse whereas writing serves to activate the payload.

For example, a Trojan horse can be configured to scrutinise the inputs of the circuit 11 to detect particular data (or a particular data sequence) which corresponds to its activation. The Trojan horse could then either inject a fault into the host system or filter out information by connecting registers containing sensitive data to output registers of the circuit 11.

The protection system 100 in accordance with the invention enables modification of at least one clear variable of the host 11 (corresponding to a signal or a sequential gate of the circuit, for example) so that its meaning is concealed from any malicious circuit such as a Trojan horse. As used here, the expression clear variable designates any non-protected variable. Any clear variable is therefore such that a Trojan horse could benefit from connecting to it for its attack to succeed, i.e. both to read its value via its trigger part and to write another value via its payload execution part.

The process of fabricating a circuit comprises a plurality of successive phases including the following preliminary phases:

a phase of modelling the circuit (hardware and software) in which the circuit is modelled at a very high level in order to validate in performance terms the chosen architecture relative to the application constraints;

a high-level language description phase, after validation of the architecture in the modelling phase, in which the implementation of the circuit is described at the register transfer level (RTL) in the form of sequential elements (registers, latches) and combinational logic elements corresponding to the combinations between the inputs/outputs of the sequential elements and the principal inputs/outputs of the circuit; this description, referred to as the behavioural description, is coded using a high-level programming language (e.g. RTL, etc.);

a logic simulation phase to simulate the description using a simulator. The simulator simulates each interconnection signal in time as a function of an input stimulus described beforehand. The simulation may include simulation of the executable program associated with the processor of the circuit if its includes one;

a functional verification phase may be implemented to complement the simulation, notably to simulate longer operations, to accelerate the simulation and to obtain more complete results, using languages based on modelling by assertion to define the functional properties that the circuit must verify. The functional verification may either be implemented on the basis of random stimuli generators with automatic verification of the results relative to a reference model or use formal functional verification tools;

a logic synthesis phase in which the behavioural description of the circuit is refined to yield a structural description at the level of the logic gates (netlist), based on a library of logic gates (for example AND, OR gates, latches, etc.) specific to the target technology and/or to the foundry that will fabricate the circuit. The logic synthesis may take account of various operating constraints. The logic synthesis may be implemented by means of an EDA tool configured to transform the behavioural description in high-level language into a generic structural description (independent of the logic gate library) describing the combinational and sequential logic elements in generic form, then replacing them with elements from the logic gate library so as to meet conditions bearing on the characteristics of the circuit (e.g. logic paths of the circuits) relative to time constraints (for example, circuit operating frequency) and space constraints (size of silicon). If the elements selected do not meet the constraints, the synthesis tool can test other gates from the library. Following the logic synthesis, a computer file (corresponding to the structural description) is obtained in a chosen format such as Verilog, VHDL, EDIF. This file represents the instantiation of the gates from the library and their interconnection, representing the electronic circuit (netlist). Such a representation comprises only Boolean variables each represented by 1 bit.

The circuit can then be fabricated in the factory (foundry).

The classic approach to protecting a circuit or program is based on the exploitation of its behavioural description by a developer who describes the circuit or program in high-level language. Such a behavioural description is generally relatively concise, because the representation and the processing of the variables are removed. The variables can be understood easily because the behavioural description provides not only the value of the variables but also their meaning. In the classic approaches, the developer can therefore interpret the variables semantically so as to have an intellectual mastery of the code.

To be more precise, conventional circuit protection solutions protect each natural variable individually at the byte (8-bit vector) level following manual analysis of the behavioural description. The consequence of this is that it is very difficult to use codes with long (minimum and dual) distances and/or codes of great length, with the result that the codes used for the protection of the natural variables are not the optimum. Additionally the conventional solutions aim to protect selectively a specific category of signals, such as the sequential signals that store data, for example, and not the sequential signals used to check data.

However, in practice, applying protection at the level of the behavioural description has a number of disadvantages:
the variables are protected individually with the result that it is the semantic of the circuit to be protected that guides the protection, not the security objectives,
some variables, such as in the state of the AES (Advanced Encryption Standard) encryption algorithm, for example, are very short (k=8 bits only), which compromises the quality and the efficacy of the codes,
some implicit variables, such as loop counters, may be omitted from the protection step.

Unlike the behavioural description, the structural description does not enable any meaning to be given to the Boolean variables, which may have been obtained after simplification, fusion between variables, and the representation of which is not intuitive.

The inventors have nevertheless developed a circuit protection system and method based on the structural description of the circuit.

To be more precise, the protection system 100 is configured to modify the structural description of the circuit after the logic synthesis phase so as to convert one or more variables into protected variable(s) by inserting circuit elements (variable protection elements 10) directly into the circuit, these elements making it possible to control the changes of the protected variables after the fabrication of the circuit. In some embodiments, the protection system 100 is configured also to insert circuit elements configured to detect faults injected into the circuit (fault detection elements 12).

The circuit is then fabricated with such protection elements (variable protection elements and where applicable fault detection elements) that are used to update the status of the protected variables and/or for fault detection as a function of clock events.

In the logic synthesis phase, the protection system 100 in accordance with the invention is configured to select a set of k elementary Boolean vectorial variables (also referred to hereinafter as elementary variables) of the structural description of the circuit as a function of predefined criteria, each variable being represented by 1 bit on the basis of predefined selection criteria. The selected k elementary variables are then used to construct a global variable x of length k (i.e. represented by k bits) by concatenating the selected elementary variables in a chosen order in a vector of k bits. The clear variable x of size k is then protected by encoding its content and using a random bit vector, which produces a protected variable z. The order of the concatenation of the k variables may be arbitrary. It may be stored to be used in the phase of reading the protected variable z (produced as a consequence of protecting the Boolean vectorial variable x) and/or to write it.

To be more precise, the protection system 100 encodes the variable x of length k on the basis of a binary code C of length n and of size $2^k$ (k corresponding to the size of the variable x) comprising a set of words and belonging to a vector space, generates a random bit vector and encodes it with the supplementary code D of the code C in the vector space. The code C has a given minimum distance $d_C$ equal to the shortest Hamming distance between two different words of the code. The protection system 100 thereafter encodes the random bit vector y by the code D before adding it in this encoded form to the variable x encoded by the code C, which produces a protected variable z, represented by n bits, which is substituted for the original non-protected variable x. The random bit vector comprises a set of random, non-predictable bits. The original variable x of the circuit being substituted with a protected variable z, the operation of writing on x is itself also substituted with a new operation which consists firstly in encoding x by the code C, encoding the random bit vector y by the code D, combining the two code words obtained in this way and writing the result in the variable z. Similarly, the operation of reading on x is substituted with a new operation of reading on z and thereafter a decoding to retrieve the original variable x. These new operators make it possible to replace the variable x with a protected variable z at the same time as keeping identical functionality in terms of reading and writing the data carried in the non-protected circuit by x. The variable protection elements determined for encoding and decoding the variable x are inserted into the structural description of the circuit. The choice of coding and decoding operators is described hereinafter. Following the fabrication of the circuit 11, these variable protection elements are used to update the state of the protected variables as a function of a clock event.

The protection system 100 is moreover configured to determine the fault detection elements to be inserted into the circuit to impede both correct operation of the trigger and execution of the payload of a Trojan horse introduced into the protected circuit 11.

After the fabrication of the circuit, the fault detection elements are used for surveillance of the circuit and to trigger an alarm as soon as a fault is detected in the circuit 11.

On each clock event, the clear variable x theoretically changes state. Moreover, the random bit vector generator is notably a generator of random numbers adapted to update the random bit vector y on each clock event (for example each clock rising edge). The variable z then goes to the next state.

For example, as applied to signal type variables, in an operational mode of the circuit (fabricated circuit) the variable protection elements 10 are configured to update the protected variable z on the basis of the new value of the random bit vector, and can then apply the decoding operation. As applied to variables stored in logic gates, the protection system 100 applies the code C, adds the encoded random bit vector at the input of the gates, and then applies a decoder at the output of the gates.

Access to the non-protected variable x of k bits is therefore no longer possible. The system 100 therefore ensures that any connection to the protected variable z (signal value or value stored in a sequential logic gate 120) discloses no information on its content (Trojan horse insertion prevention function) if the connection is effected on only certain bits of z.

In certain embodiments, the code C and its supplementary code D may be generated beforehand so as to meet a first security condition relating to the dual distance of the supplementary code D.

The dual code $D^{\perp}$ of the binary code D contains all the code words orthogonal to those of D, which means that the scalar product of a code word of D and a code word of $D^{\perp}$ is equal to zero. When the code D is linear, the dual distance of the supplementary code D corresponds to the minimum distance of the dual code of D denoted $d_D\perp$.

The first security condition may in particular define a predefined target value for the dual distance of the code D, while the code C is determined so that its size is at least equal to the number k of variables of the circuit selected and is supplementary to the code D, based on a database of candidate binary codes. When the code D is not linear, the dual distance concept is associated with a more general definition.

In a complementary way, the code C and the supplementary code D of the code C may be determined so as to meet a secondary security condition relating to the length n of the code C and/or to the minimum distance $d_C$ of the code C.

The code C and the supplementary code D may furthermore be determined beforehand so as to meet a secondary security condition relating to the quantity $$\frac{2^n - 2^k}{2^n - 1}.$$

In the embodiments in which the code C is calculated on the basis of the target dual distance (denoted $d_D^{\perp}$), the protection of the circuit 11 is optimised against triggering or payload injection operations by a malicious circuit such as a Trojan horse. As established by the inventors, the effect of choosing such a code is that any attacking circuit that attempts to descramble the circuit 11 to retrieve its functionality in order to identify among the variables (signals and/or gates) those that are sensitive (and therefore of interest to a Trojan horse) cannot insert a Trojan horse unless it connects to a number of lines of the circuit at least equal to the dual distance (denoted $d_D^{\perp}$) of the supplementary code D of C to cancel out the effect of the random bits and therefore to be able to use the clear bits for triggering purposes.

In fact, for a uniformly distributed mask y and for D having a dual distance $d_D^{\perp}$, any tuple with coordinates of yH is balanced if it is composed of 1, 2, ..., ($d_D^{\perp}$−1) bits (A. Samad Hedayat, Neil James Alexander Sloane, and John Stufken. Orthogonal Arrays, Theory and Applications. Springer series in statistics. Springer, New York, 1999. ISBN 978-0-387-98766-8). The $d < d_D^{\perp}$ bits of the variable z that the hacker probes are therefore masked by a Vernam number (i.e. a non-predictable disposable mask).

However, for the attacking system to attack to connect to such a number $d_D^{\perp}$ of lines, the Trojan horse will necessarily be of large size and will therefore be identifiable by classic visualisation or edge effect analysis means (excess consumption, etc.).

The code C used to encode the variables may in particular be a linear code C. The remainder of the description refers by way of non-limiting example to the use of a linear binary code of vector sub-space type of the finite body $F_2^n$ and to sequential variable type variables (variables dependent on values previously calculated and stored in memory, such as register and/or memory output variables of the protected circuit 11).

The code C is characterized by parameters n, k, and $d_C$ such that:
  n designates the length of the code,
  k designates the number of payload bits (before coding), also referred to as the dimension, and
  $d_C$ designates the minimum Hamming distance between two different words of the code.

The efficiency r of the code C designates the ratio r=k/n. The overcost linked to coding is measured via the efficiency r of the codes (the efficiency is defined as the ratio r of k to n, r=k/n). The higher the efficiency, the lower the overcost. Now, the efficiency r is proportional to the length and/or size of the code (according to the source coding theorem of Claude Shannon). Consequently, if the efficiency is high, at a given distance $d_C$, the code words of n bits are not much longer than the information words of k bits, and the code is therefore efficient. The protection of vectorial variables obtained by aggregation of a large number of bits is therefore favourable to reducing the implementation overcost.

The minimum distance $d_C$ may be chosen sufficiently large for the code to be able to detect and/or correct faults by allowing the parameters n and k to grow. The remainder of the description mainly considers the detection of faults.

The linear code C is associated with a generator matrix G of size k×n making it possible to generate a code word c of n bits from the variable x of k bits that is a Boolean vectorial variable (word of k bits), in accordance with the following equation 1:

$$c = xG \qquad \text{(equation 1)}$$

Such notation makes it possible to represent the encoding of a variable x by the code C with generator matrix G, which gives the code word c.

A supplementary code D of the code C is such that the complete space $F_2^n$ corresponds to the direct sum of the code C and the code D in accordance with the following equation:

$$\mathbb{F}_2^n = C \oplus D$$

All the elements of the body $\mathbb{F}_2^n$ can then be represented by combining in a linear manner, and in a unique form, the words of C and D. The generator matrix of the code D is denoted H. The matrix H is of size (n−k)×n. The property of supplementarity between C and D is expressed by means of their respective generator matrices G and H in the following manner:

The matrix $$\begin{pmatrix} G \\ H \end{pmatrix}$$

of size n×n has a maximum rank of n, i.e. it is reversible.

Denoting by d the elements of the code D obtained by way of the image of the linear application which associates yD with y, d is given by the following equation 2:

$$d = yH \qquad \text{(equation 2)}$$

where $y \in \mathbb{F}_2^{n-k}$ and $d \in \mathbb{F}_2^n$.

Such notation makes it possible to represent the encoding of the vector y by the code D with generator matrix H, which yields the code word d.

Any element z of the body $\mathbb{F}_2^n$ may therefore be written:

$$z = xG \oplus yH \qquad \text{(equation 3)}$$

The variable protection device 100 in accordance with the invention relies on this property to inject random values into the variable x of k bits and to implement the operator writing on z substituted for the original operator for writing on x. The variable protection device 10 is therefore configured to thwart/foil an attack intended to extract the variable x based on the knowledge of an element z using the random mask represented by yH.

A protected variable z implanted in the circuit can be decoded in the combinational logic from the knowledge of the generator matrices G and H and the random bit vector y. In fact, equation 3 can be rewritten in the following form:

$$z = (x \ y) \begin{pmatrix} G \\ H \end{pmatrix}$$

The above relation can be rewritten as follows:

$$(x \ y) = z \begin{pmatrix} G \\ H \end{pmatrix}^{-1}$$

The following notation is then used:

$$(J \ K) = \begin{pmatrix} G \\ H \end{pmatrix}^{-1}, \qquad \text{(equation 4)}$$

where J designates a matrix of size n×k and K designates a matrix of size n×(n−k).

On the basis of the protected variable z, the definition of J and K and therefore of G and H (equation 4), it is possible to deduce the corresponding values of x and/or y and then z from equations 5 and 6:

$$x = zJ \qquad \text{(equation 5)}$$

$$y = zK \qquad \text{(equation 6)}$$

Equations 5 and 6 correspond to the decoding operations that make it possible to reconstitute the values of x and y, respectively, and to carry out the operation of reading on z substituted for the original operation of reading on x (the coding of x and y in z is reversible). The matrix J represents the decoding matrix associated with the coding matrix G. Similarly, the matrix K represents the decoding matrix associated with the coding matrix H. Note that by virtue of the unique inverse of the matrices, the following remarkable equality relations are verified:

$$(J \ K)\begin{pmatrix} G \\ H \end{pmatrix} = I_n = \begin{pmatrix} G \\ H \end{pmatrix}(J \ K) = \begin{pmatrix} GJ & GK \\ HJ & HK \end{pmatrix} = \begin{pmatrix} I_k & O_{k\times(n-k)} \\ O_{(n-k)\times k} & I_{n-k} \end{pmatrix}$$

where $GJ = I_k$;

$GK = O_{k\times(n-k)}$;

$HJ = O_{(n-k)\times k}$;

$HK = I_{n-k}$.

In the above equations, $I_l$ for l=k, n−k (therefore for l=k or l=n−k) designates the square matrix of size l×l equal to the identity matrix and $O_{k\times(n-k)}$ designates the rectangular matrix of size k×(n−k) that has all its inputs at 0.

Figure 2:
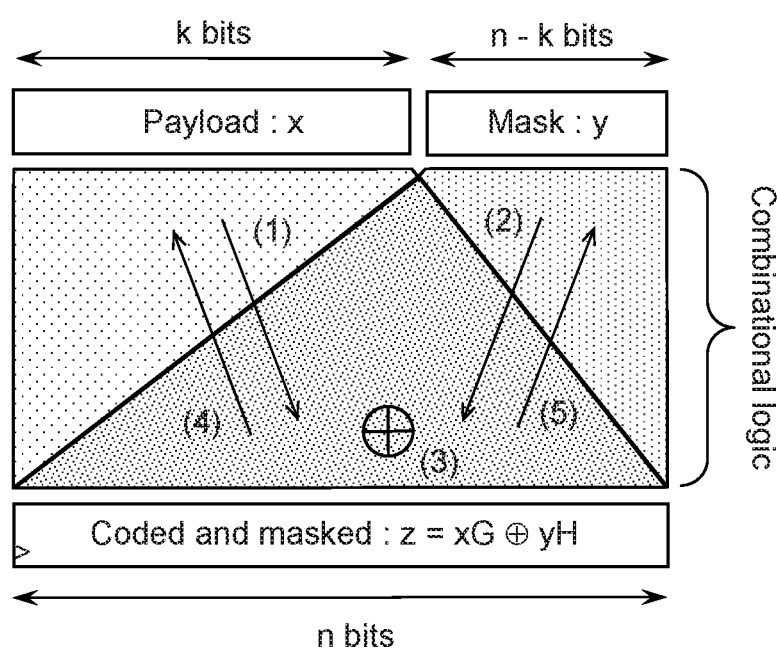
FIG. 2 is a diagram illustrating the coding of data coming from two supplementary vector spaces.

FIG. 2 shows the relations between the variable x (payload) of k bits, a mask y of (n−k) bits and a protected variable z of n bits (coded and masked data).

This Figure shows that the clear variable x is encoded by a binary code C determined as a function of the dual distance $d_D^\perp$ and then added to a mask (code word yH) and stored in a register z of n bits. In this way, a hacker has access only to the protected value z which cannot leak useful information on the variable x of k bits (corresponding to the original k clear variables of the structural description of the circuit) unless at least a number of bits corresponding to the dual distance of D denoted $d_D^\perp$ are read by a Trojan horse.

The vector space $D^\perp$ is associated with a generator matrix H' of size k×n, making it possible to generate a dual code word d' of n bits from a word y' of k bits:

$$d' = y'H' \qquad \text{(equation 7)}$$

The dual code $D^\perp$ of the binary code D contains all the code words orthogonal to those of D (i.e. the scalar product of a code word of D and a code word of $D^\perp$ is equal to zero).

This property of orthogonality is expressed on the code generator matrices by:

$HH'^T = 0$, where $H'^T$ designates the transposed matrix of H'.

The Hamming weight function, denoted $w_H$ designates the function that returns the number of bits set in a bit vector.

In formal terms, the minimum distance $d_c$ of the code C is given by the equation:

$$d_c = \min\{w_H(c' \oplus c); c' \text{ and } c \in C \wedge c' \neq c\}.$$

The dual distance of the code C is denoted $d_C^\perp$. The minimum dual distance $d_C^\perp$ of the code C is given by the relation:

$$d_C^\perp = \min\left\{w_H(c'); c' \in \mathbb{F}_2^n, c' \neq 0 \bigwedge \left(\sum_{c \in C}(-1)^{c'\cdot c} \neq 0\right)\right\}$$

In the above relation, the notation c'. c designates the canonic scalar product of the two bit vectors c' and c.

Note that the minimum distance the dual distance of two orthogonal linear codes verify the following equation 8:

$$d_C^\perp = d_C\perp \quad \text{(equation 8)}$$

A scenario example is considered whereby a hacker seeks to insert a Trojan horse that touches on a plurality of lines of the circuit, either by way of consultation to trigger the Trojan horse or by way of modification to execute its payload. As indicated above, preventing insertion of the trigger part of a Trojan horse, if any, is based on the security property whereby if a hacker probes up to at most $(d_D^\perp - 1)$ lines of a given variable z, the hacker has no access to information on x if the mask y is uniformly distributed (property 1).

The dual distance $d_D^\perp$ of the code D therefore represents a security parameter that can define:
- the minimum number of inputs/outputs of a Trojan horse that enables the trigger part of the Trojan horse to decode the clear information of the circuit,
- the minimum number of points of a probing bench that a hacker must use to extract information that includes clear data,
- the minimum order of a side-channel attack. The extraction of the random mask y from the protected variable z (equation 6) does not make it possible to supply clear information to the hacker. However, the hacker may still hope to inject a fault into the content of the variable z in order to propagate an error x via the decoding of z.

The parameter y may nevertheless serve to detect the presence of a fault injection attack in some embodiments, caused either by the payload of a Trojan horse or by external injection (clock, voltage glitch, laser firing, etc.) on comparing the vector y to zK.

In fact, the fault detector 12 can determine if the relation y=zK is satisfied (verification or test) and as a function of this verification detect the presence of an attack by a malicious circuit (connection to parts of the circuit), whether this is an internal attack via the payload of a Trojan horse or an external attack via physical injection of a disturbance.

If a fault is injected into a code word c=xG of the code C with a fault ε, the resulting erroneous code word may be broken down in the form c̃=c⊕ε=xG⊕ε. By applying the matrix K, the following relation is obtained from the previously stated remarkable identifies on the matrices G, H, J and K: c̃K=xGK⊕εK=εK. The data εK corresponds to the syndrome and can be used in the decoding step to correct the information.

The reliability of such a test is based on the property whereby if a hacker falsifies the state of the variable z with a uniform distribution of the faults $\varepsilon \in (\mathbb{F}_2^n)^*$, then the probability that they will cause themselves to be detected is:

$$1 - \frac{2^k - 1}{2^n - 1} \text{ (property 2).}$$

In a complementary way, the integrity of the calculations at the level of the code C may be verified by means of equation 5 to the extent that a fault on the protected variable z may propagate onto the variable x, which corresponds to an injection that is useful for the hacker. As the variable z contains all of the information on the clear variable x, a copy z' of z can be retained and their projections zJ and z'J compared, that is to say by doing the same operation as on the mask y, but symmetrically on the information part x (in other words by testing if x=zJ). In the absence of fault(s), the two quantities x and zJ are equal. However, a difference between x and zJ reveals injection of fault(s).

To detect a fault, the protection system 100 can use the test consisting in verifying if y=zK. The reliability of such a test is based on the property whereby if a hacker falsifies the state of the variable z with a uniform distribution of the faults $\varepsilon \in (\mathbb{F}_2^n)^*$, then the probability that they will cause themselves to be detected is:

$$1 - \frac{2^k - 1}{2^n - 1} \text{ (property 2).}$$

In fact, if the hacker injects a fault $\varepsilon \in \mathbb{F}_2^n$, z is transformed into $z \oplus \varepsilon \in \mathbb{F}_2^n$. As ε=0 corresponds to a fault that does not modify z, i.e. to an absence of fault injection, this case is eliminated so that it is assumed that ε is uniformly distributed in $(\mathbb{F}_2^n)^*$ (notation signifying $\mathbb{F}_2^n$ deprived of zero). The hypothesis of uniform distribution of ε in $\mathbb{F}_2^n$ signifies that, if the hacker has managed to inject a fault (ε≠0), all the other values of ε are possible and equiprobable. As $\mathbb{F}_2^n$ corresponds to the direct sum of C and D, there exists a unique pair (e, f)$\in \mathbb{F}_2^k \times \mathbb{F}_2^{n-k}$ such that ε=eG⊕fH. A fault is detectable if (z⊕ε)K≠y. This condition is equivalent to y⊕f≠y, i.e. f≠0. Therefore, conversely, a fault is non-detectable if f=0, i.e. ε=eG∈C. As, by hypothesis, ε is uniformly distributed in $(\mathbb{F}_2^n)^*$, the probability of non-detection is therefore $(2^k-1)/(2^n-1)$, which gives a probability of detection of $$1 - \frac{2^k - 1}{2^n - 1}.$$

Note that this fault detection probability does not depend on the minimum distance of the code $d_C$. On the other hand, for the fault not to be detected, the hacker must inject a fault ε the Hamming weight of which is greater than or equal to $d_C$, which corresponds in this model of the hacker to a cost of injection of the fault. Moreover, in the embodiments in which the faults of low weight are more probable than the faults of high weight, the probability of detection may also depend on n and $d_C$.

A result of this is that if a hacker connects to up to $d_C-1$ lines of the variable z and y and injects a fault therein, then the probability that this fault will be detected is 1 (certain detection).

In the embodiments in which the protection system comprises a fault detector 12, the fault detector 12 may be determined from the minimum distance property of the code C.

In fact, a fault ε≠0 is non-detectable if and only if ε∈C. All the non-null elements of C having a Hamming weight greater than or equal to the minimum distance $d_C$, if the fault ε≠0 reaches $d_C-1$ (or fewer) lines of z, then ε∉C, and the fault is therefore detected.

The values $$1 - \frac{2^k - 1}{2^n - 1} = \frac{2^{dim(\mathbb{F}_2^n)} - 2^{dim(C)}}{2^{dim(\mathbb{F}_2^n)} - 1}$$

and $d_C$ therefore constitute two other (so-called secondary) security parameters that make it possible to quantify the security level of a circuit protected against injections of faults. As a function of the fault model (mainly uniform or rather of low Hamming weight), one or the other of the parameters may be considered.

Figure 7:
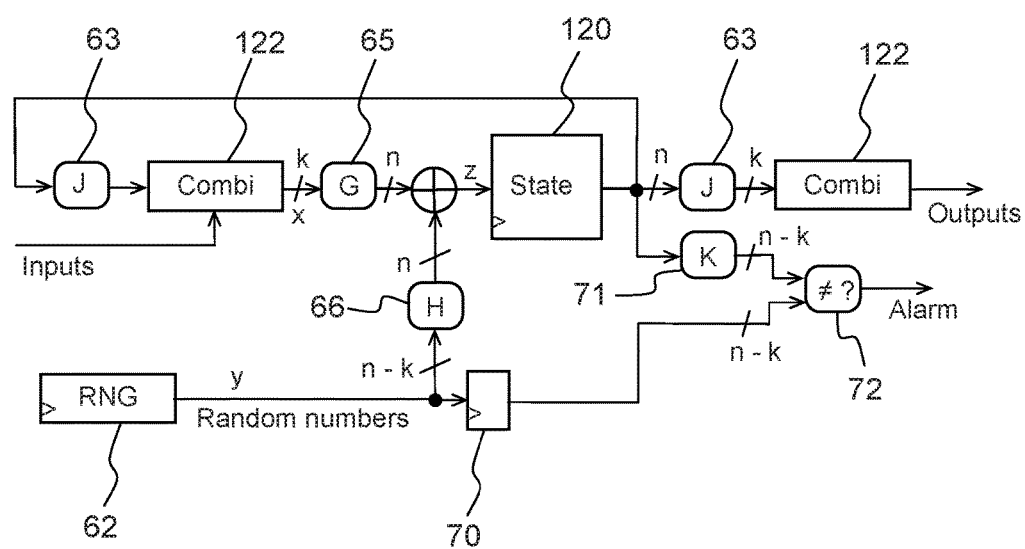
FIG. 7 represents a circuit protected by the protection system in accordance with a second embodiment with fault detection.

Moreover, in the situation where the hacker were in a position to target the variable y, a new attack scenario may be envisaged whereby the attacking system could inject a fault into the variable z without being detected. Such a scenario would consist in injecting a fault ε into the variable z that would produce the syndrome εK and injecting into the variable y a fault equal to εK. In this way, the test of the fault detector 12 would effect the comparison $(z \oplus \varepsilon)K = y \oplus \varepsilon K$, such equality being verified for all ε. Such a fault would modify the state without triggering an alarm (FIG. 7 embodiment).

To address such an attack scenario and to obtain provable security, in addition to the coding by the code D (supplementary code of the code C), the variable y may further be encoded by a code E of dimension greater than or equal to n−k and producing words of size m, associated with a generator matrix L and a decoding matrix M. The code E is accompanied by a supplementary code F the decoding matrix N of which corresponds to the control matrix of E, i.e. to the matrix enabling fault detection on E. The code F moreover has a generator matrix P such that the following relation is verified:

$$\begin{pmatrix} L \\ P \end{pmatrix}^{-1} = (M \quad N).$$

By way of non-limiting example, in the same way as the codes C and D, the codes E and F can be supplementary in the vector space $\mathbb{F}_2^n$, which corresponds to the special case m=n.

In this embodiment, the random variable y used for the verification of fault injection on the variable z may be stored in coded form y'=yL. The fault detector 12 then carries out the tests zK=y'M and y'N=0. The first test makes it possible to verify that the attacking system has not injected a fault into the variable z of Hamming weight less than $d_C$ while the second test makes it possible to verify that the attacking system has not injected a fault into the coded variable y' of Hamming weight less than the minimum distance denoted $d_E$ of the code E.

In such an embodiment, the minimum Hamming weight cost of a non-detectable attack is $\min(d_E, d_C)$. In the case where the faults on the coded variables z and y' are uniformly distributed, and for code words E of size m, the probability of detection becomes:

$$\frac{2^{dim(\mathbb{F}_2^m)} - 1}{2^{dim(\mathbb{F}_2^n)}}.$$

In the embodiments in which the protection system comprises a fault detector 12, the fault detector 12 may be determined on the basis of the minimum distance property of the code C and the minimum distance of the code E.

The matrix operators G, H, J and K defined above may advantageously be re-used, for example, in the case where n−k≤k, by using the code C in place of the code E or again by using the code D in place of the code E. This makes it possible to preserve a provable security against fault injection attacks on the coded registers z and y' at the same time as reducing the necessary resources.

In one particular embodiment, the code E may therefore be chosen equal to the code D (supplementary code of the binary code C), the encoded variable y' then being of size n−k and equal to y·H.

In a first embodiment, it is possible to use the code D in place of the code E to code the variable y (while the supplementary code F of the code E is equal to the binary code C), which yields y'=yH, the fault detector carrying out the tests zK=y'K and y'J=0. The minimum Hamming weight cost of a non-detectable attack is then equal to $\min(d_C, d_D)$. In the case where the faults on the coded variables z and y' are uniformly distributed, the probability of detection becomes:

$$\frac{2^{dim(\mathbb{F}_2^n)} - 1}{2^{dim(\mathbb{F}_2^n)}}.$$

Alternatively, in a second embodiment, the code E may be made equal to the binary code C while the supplementary code F of the code E is equal to the supplementary code D of the code C, the variable y of (n−k) bits being transformed into a variable $y_k$ of n bits and the encoded variable y' being of size n and equal to $y_k H$.

In particular, if n−k≤k, it is possible to construct a vector $y_k$ of size k on the basis of the variable y of size n−k, for example by concatenating y with constant or random data. It is then possible to code $y_k$ with the code C in place of the code E. The coded variable y' then becomes $y'=y_k G=(y \uparrow_k)G$ where the operator $\uparrow_k$ designates the operation consisting in increasing the size of the vector up to k, for example by data padding. The fault detector 12 then performs a first test $zK=(y'J) \downarrow_{n-k}$ in which the operator $\downarrow_{n-k}$ designates the operation of selecting the n−k bits corresponding to y in $y_k$. The fault detector 12 carries out the second test y'K=0.

In this embodiment, the minimum Hamming weight cost of a non-detectable attack is $d_C$. If the faults on the coded variables z and y' are uniformly distributed, the probability of detection again becomes:

$$\frac{2^{dim(\mathbb{F}_2^n)} - 1}{2^{dim(\mathbb{F}_2^n)}}.$$

The protection system 100 verifying a first principal security condition relating to the dual distance $d_D^\perp$ to impede the reading of the sensitive variable x, i.e. to impede the insertion of a Trojan horse trigger, can in a complementary way make it possible to detect faults (Trojan horse payload) on the basis of the use of binary codes and notably linear codes. The protection system can therefore verify secondary security conditions relating to one or more of the following parameters:

the parameter $$\frac{2^{dim(\mathbb{F}_2^n)} - 2^{dim(C)}}{2^{dim(\mathbb{F}_2^n)} - 1},$$

and/or
the parameter $d_C$, and/or
the parameter $$\frac{2^{dim(\mathbb{F}_2^n)}-1}{2^{dim(\mathbb{F}_2^n)}},$$

and/or
the parameter $d_D$, and/or
the parameter $$\frac{2^{dim(\mathbb{F}_2^n)}-1}{2^{dim(\mathbb{F}_2^n)}},$$

and/or
the parameter $d_E$, and/or
the parameter $$\frac{2^{dim(\mathbb{F}_2^m)}-1}{2^{dim(\mathbb{F}_2^n)}}.$$

The detection of faults notably make it possible to detect a hypothetical Trojan horse, if the latter is triggered despite the insertion prevention method.

In one particular embodiment, the supplementary code of the code C may be the dual code of the code C.

Figure 3:
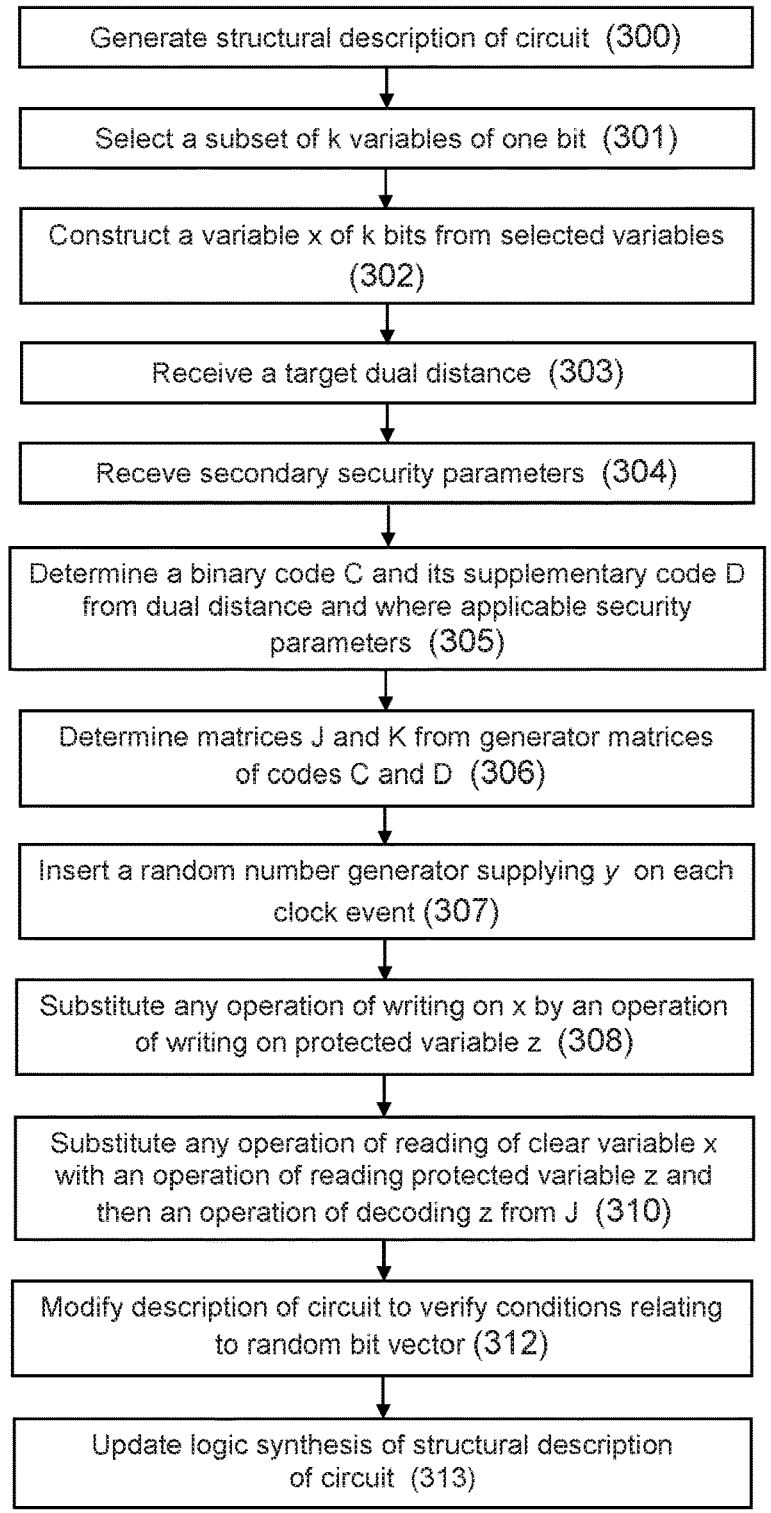
FIG. 3 is a flowchart representing the protection method in accordance with certain embodiments.

FIG. 3 shows the circuit protection method in accordance with certain embodiments implemented in the logic synthesis phase.

In the step 300, a structural description of the electronic circuit in low-level language is generated from a behavioural description in high-level language, in the phase of logic synthesis of the circuit, for example using EDA type logic synthesis tools.

The structural description comprises a description of the variables of the circuit 11 and of the elements of the circuit 11 such as the combinational resources, sequential resources and lines. The variables of the circuit are represented by one bit in the structural description.

In the step 301, a set of elementary variables of the circuit (each represented by 1 bit), as described in the structural description, is selected on the basis of one or more predefined criteria such as sensitivity criteria, for example, or taking into account a criticality parameter. The elementary variables selected may be of the same kind or of different kinds (heterogeneous variables). The number of variables selected is denoted k.

Of course, the invention is not limited to these particular elementary variable selection criteria. In one embodiment, the set of all elementary variables of the circuit may be selected in the step 301 (conservative approach). Alternatively, the selection criteria employed in step 301 may bear on the name of the variables during the logic synthesis, using, where appropriate, regular expressions by instructing the synthesis tool to retain the naming of the signals (or at least their root) in the interconnection graph (netlist).

Integrated systems designed in layers may comprise a security root (root of trust), which is a part that ensures integral starting of a platform. In such an embodiment, the elementary variable selection criteria may alternatively consist in selecting the elementary Boolean variables associated with the security root, which can be done by effecting a hierarchical logic synthesis that yields a hierarchical structural description of the system. It is then possible to apply the protection only to the identified variable(s) considered to form part of the security root.

In a further variant, the selection criteria may bear on a sensitivity indicator associated with the variables in the interconnection graph (for example by a tainting technique).

In the step 302, a representation of the k variables selected in this way is generated in the form of a unique variable of k bits, for example by concatenation of the variables in a chosen order.

In the step 303, as a function of the applicable security rules, a security parameter $d_{D_{cible}}^{\perp}$ is predefined representing the target dual minimum distance of the supplementary code D of the linear code C used for encoding. This parameter corresponds to the minimum number of variables of the circuit to which a Trojan horse must connect to recover (i.e. decode) clear information and therefore have a behaviour that is useful (from the point of view of the attacking system).

In a complementary way, secondary security parameters may be received (304). These secondary parameters may comprise:
a target length $n_{cible}$ of the code, chosen sufficiently short not to increase excessively the size of the circuit after protection,
a sufficiently high target detection probability $$\left(\frac{2^{dim(\mathbb{F}_2^n)}-2^{dim(C)}}{2^{dim(\mathbb{F}_2^n)}-1}\right)cible,$$

and/or
a sufficiently large target minimum distance $d_{C_{cible}}$ for the code C.

In the step 305, a binary code C and its supplementary code D are determined from the target security parameter $d_{D_{cible}}^{\perp}$ and a binary code library. In particular, the binary code C is determined so that the dual distance of its supplementary code D, denoted $d_D^{\perp}$ reaches the target security parameter $d_{D_{cible}}^{\perp}$. In a complementary way, the code C may be determined so as to satisfy conditions relating to the secondary security parameters if such parameters have been defined in the step 304 comprising:
a condition linking the length n of the code to the target length $n_{cible}$: for example, the code C may be determined so that its length n is less than the target length $n_{cible}$, and/or
a condition linking the probability of detection to the target probability of detection: for example, the code C may be determined so that the parameter $$\frac{2^{dim(F_2^n)}-2^{dim(C)}}{2^{dim(F_2^n)}-1}$$

is greater than or equal to the target detection probability $$\left(\frac{2^{dim(F_2^n)}-2^{dim(C)}}{2^{dim(F_2^n)}-1}\right)cible,$$

and/or
a condition linking the minimum distance $d_C$ of the code to the target minimum distance $d_{C_{cible}}$: for example, the code C may be determined so that its minimum distance $d_C$ is greater than or equal to the target minimum distance $d_{C_{cible}}$.

In the step 306, the matrices J and K are determined on the basis of the information coding matrix (G) and the mask (H) in accordance with equation 4 (G and H being known):

$$(JK) = \begin{pmatrix} G \\ H \end{pmatrix}^{-1} \quad \text{(equation 4)}$$

In the step 307, the structural description of the circuit is modified to insert a random number generator RNG configured to generate a random bit vector y represented by n–k random bits per clock period when the circuit is operational.

In the step 308, the structural description of the circuit is modified so as to substitute for any operation of writing on x an operation of writing on a protected variable z represented by n bits, the variable z being obtained by:
encoding the clear variable x on k bits associated with the original k variables selected by the code C, i.e. if the binary code C is associated with a generator matrix G by a new state of n bits corresponding to xG;
encoding the bit vector y by a code of dimension greater than or equal to n–k, and in particular by the supplementary code D (y is replaced by yH if the code used to encode y has a generator matrix H), the protected variable z then being obtained by means of the relation z=xG⊕yH.

The protected variable z obtained in this way forms an input that feeds a new bank of n registers of 1 bit.

In certain cases where the variable is a sequential variable constituting the input of a sequential resource, the current state x of the variable may be used to calculate the outputs of the sequential resource. Now, as the protected variable z has been substituted for the non-protected variable x, the current state x is from here on rendered inaccessible. However, the output of the sequential resource may be determined on the basis of the decoding of the protected variable z on the basis of the matrix J determined on the basis of the code C and the code D and more particularly on the basis of the generator matrices of the code C and the code D.

More generally, in the step 310, any operation of reading the non-protected variable x is replaced by an operation of reading the protected variable z followed by an operation of decoding the read value of the variable z using the decoding matrix J (in accordance with the relation of equation 4 x=zJ).

In a complementary way, in the embodiments in which the circuit protection method is configured to detect if faults have been injected into the circuit (for example degrading of registers by a fault), the method may comprise a step 312 consisting in modifying the structural description of the circuit so as to verify one or more conditions relating to the value of the random bit vector y (also referred to as fault detection conditions) and to trigger an alarm if at least one fault detection condition is verified.

In the step 314, the new structural description of the circuit 11 may by synthesised, for example by means of an EDA of the same type as that used to generate the circuit 11 in the step 300. This step makes it possible to optimise the mixture of the new functional blocks added directly to the circuit 11 to protect its variables.

The circuit may then be fabricated on the basis of the new structural description (interconnection graph).

The method of protecting the circuit against insertion of the malicious circuit and where applicable of detecting faults introduced for malicious purposes has the advantage of being particularly suited to implementation by an EDA tool, on the basis of the interconnection graph. Such EDA tools may also perform logic simplifications that decease the size and/or increase the speed of the protection circuit.

Figure 4:
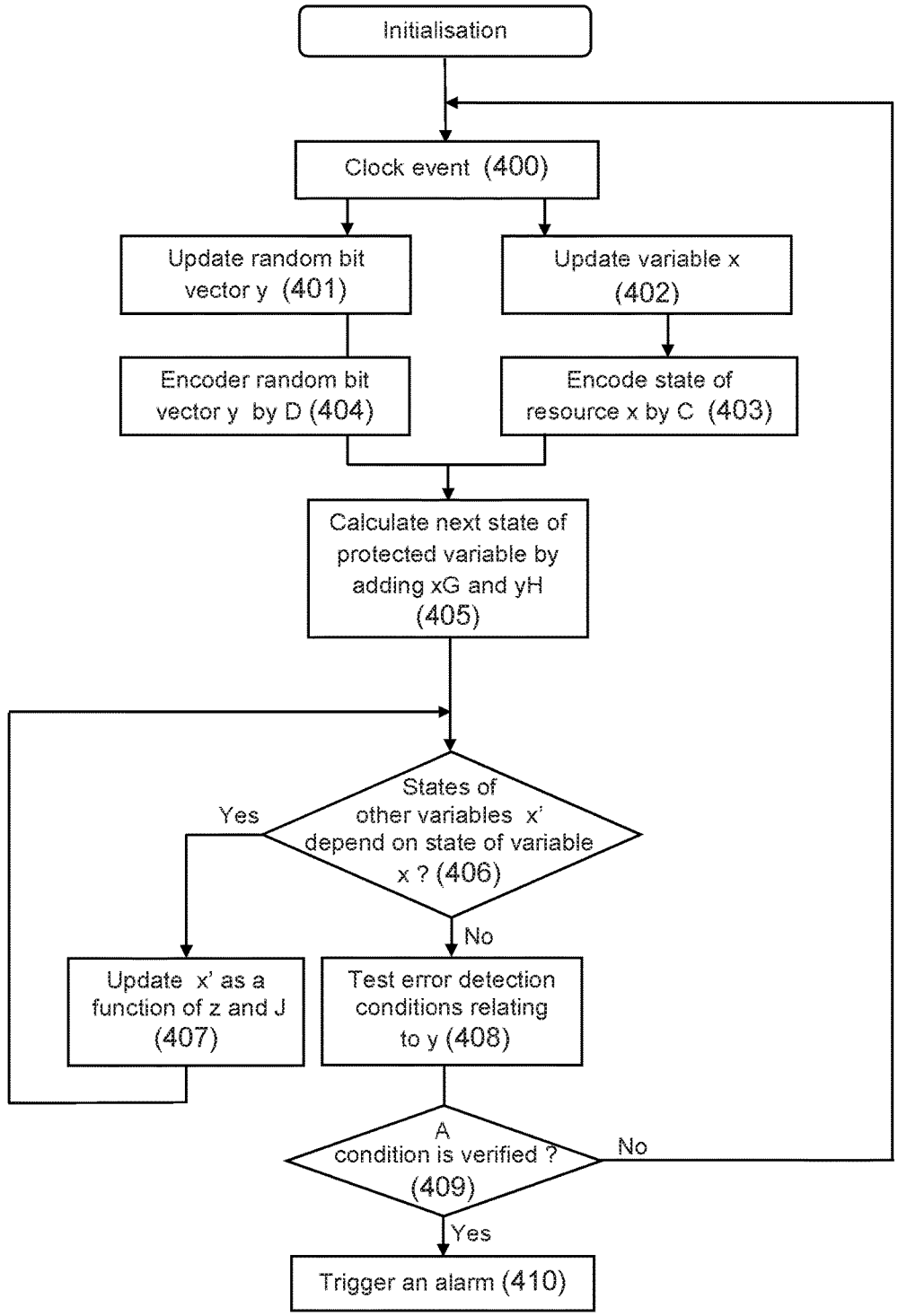
FIG. 4 is a flowchart representing the method in accordance with certain embodiments of protecting variables employed on starting the circuit.

FIG. 4 is a flowchart of the method of protecting the circuit in operational mode (after fabrication of the circuit) in accordance with certain embodiments. The circuit is timed by a clock clk.

In the step 400, a new clock event (for example a clock rising edge) is produced.

This event triggers the updating of the state of the clear variable x on k bits (which goes to the next state) (401) and the updating of the random bit vector (generation of a new random bit vector by the random number generator) in the step 402.

The next state of the variable x is updated as a function of the current state of the variable x. As the current state of the variable x has been rendered inaccessible during the design phase, the next state of the variable x is calculated from the quantity zJ that is substituted for x (equation 5), where z designates the current state of the protected variable z, by decoding z by means of the matrix J.

In the step 403, the new state of the variable x on k bits determined in this way (corresponding to the k selected original variables), denoted $x_{next}$, is encoded using the linear code C and its generator matrix G. The new state $x_{next}$ of the k original clear variables on 1 bit is replaced by a new state on n bits corresponding to $x_{next}G$.

In the step 404, the next state of the protected variable z represented by n bits, denoted $z_{next}$, is calculated, this state corresponding to the sum of the next state of the non-protected variable $x_{next}$ encoded by the code C and the vector y encoded by the supplementary code D, according to the equation $z=x_{next}G \oplus yH$ (H generating a vector space supplementary to that generated by G).

The new state $x_{next}$ of the variable x representing the new state of the k source clear variables is therefore modified by insertion of random numbers so that any attempt to connect to the protected variable does not disclose any information on the content of the k original variables.

If the variable x is a sequential variable and the current state of the variable x of the circuit is used to calculate the outputs of the associated sequential resource, in the step 406, the new state $z_{next}$ of the variable z obtained may be used to calculate the output of the resource in accordance with the equation $x_{next}=z_{next}J$ (equation 5).

In the embodiments in which the circuit protection method is configured to perform fault detection, a step 407 is executed to determine if a fault has been injected into the resource associated with the variable of the circuit (for example degrading of registers by a fault) by verifying at least one condition relating to the random bit vector y (step 408) on the basis of the matrices J and K, themselves determined from the generator matrices G and H (considering the new value of the random bit vector y generated in the step 402). If a fault is detected (409), an alarm is triggered in the step 410. If not, the method is repeated on the next clock event (step 400).

Figure 5:
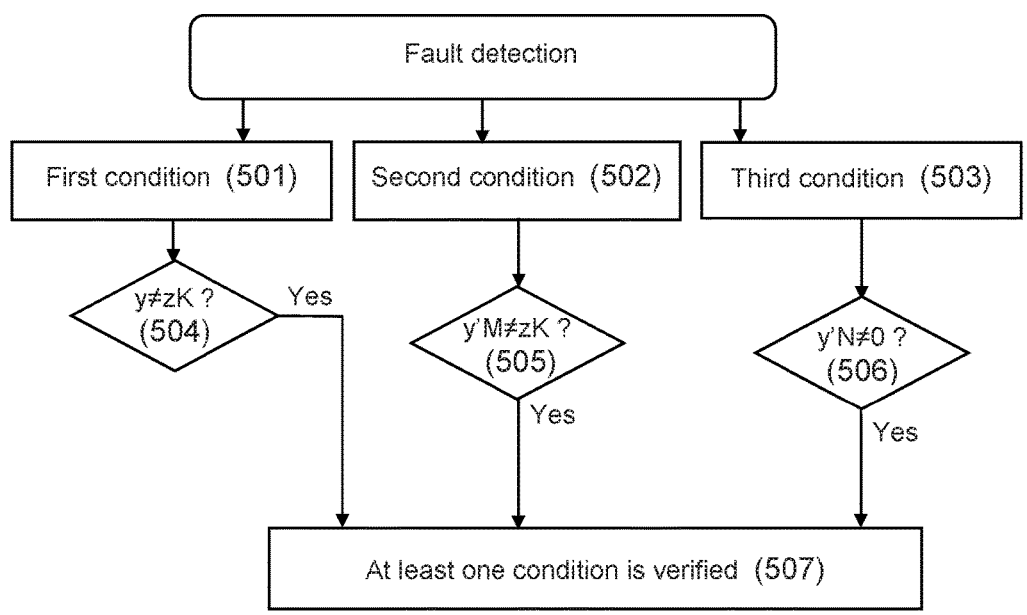
FIG. 5 is a flowchart representing the fault detection method in accordance with certain embodiments.

FIG. 5 is a flowchart showing the fault detection method (step 407 in FIG. 4), in accordance with certain embodiments.

In the step 500, one or more conditions relating to the random bit vector y are tested to detect the faults injected into the protected variable z.

Such fault detection conditions may comprise a step 504 consisting in verifying a first condition (block 501) bearing on the difference between the vector y and the quantity zK.

In a complementary way, in the embodiments in which the random bit vector y is encoded by a code E of dimension greater than or equal to n−k and producing words of size m, the code E being associated with a decoding matrix M and with a supplementary code F having a decoding matrix N corresponding to the control matrix of E (the variable resulting from the encoding of the bit vector y by the code E being denoted y'), the fault detection method may comprise:

- a step 505 consisting in verifying a second condition relating to the random bit vector y (block 502), this second condition being verified if the quantity zK is different from the quantity y'M, in which case this means that the attacking system has injected a fault into the variable z of Hamming weight less than $d_C$; and/or
- a step 506 consisting in verifying a third condition relating to the random bit vector y (block 503), this third condition being verified if the quantity y'N is different from zero, in which case it is determined that the attacking system has injected a fault into the coded variable y' of Hamming weight less than the minimum distance denoted $d_E$ of the code E.

The code E may be associated with a generator matrix L so that y'=yL. Moreover, the code F may be associated with a generator matrix P so that:

$$\begin{pmatrix} L \\ P \end{pmatrix}^{-1} = (M \quad N).$$

The fault detection method may then trip the alarm in the step 410 of FIG. 4 if any of the conditions relating to the vector y is verified (507).

The Trojan horse insertion prevention method and the fault detection method may be implemented using EDA type tools. Such tools may also make logic simplifications that reduce the size and increase the speed of the protected circuit 11. It may be useful in a complementary way to constrain the tools so that the optimisations do not eliminate (even partially) the inserted protection measures, for example by performing a block re-synthesis.

Figure 6:
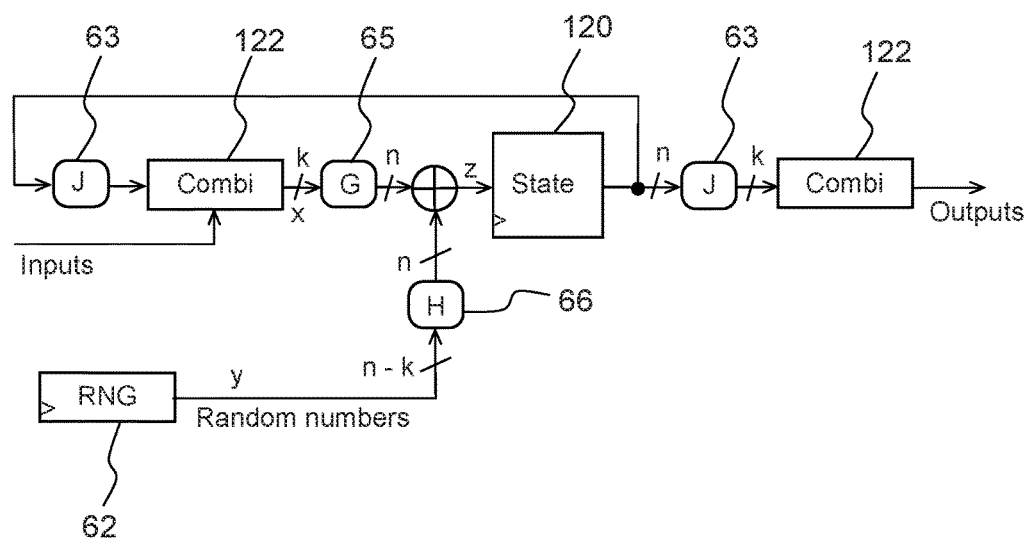
FIG. 6 represents a circuit protected by the protection system in accordance with a first embodiment.

FIG. 6 shows the elements of the protection system 100 combined with the circuit 11 to protect a circuit 11 in accordance with one embodiment.

The circuit 11 of FIG. 6 is a sequential system represented by a Moore's machine. The combinational gates 122 of the circuit 11 are bracketed by two operations, an operation of decoding by the matrix operator J, designated by the reference 63, and an operation of re-encoding by G, designated by the reference 65. The random numbers y are generated on the basis of the random number generator (for example RNG) 62 that produces n−k random bits per clock period.

Each non-clear input x of the combinational parts 122 of the circuit 11 is therefore transformed into a protected variable z by encoding by the code C with generator matrix G and addition of the signal y encoded by the supplementary code D with generator matrix H (66), in accordance with the equation z=xG⊕yH.

For example, the variable at the input of the state register 120 goes from k bits to n bits during the transformation.

Moreover, the operator J (63) is used to calculate the quantity x=zJ (equation 4), and to place the result obtained at the output of the n-bit register bank.

FIG. 7 shows a protection system 100 for protecting the circuit 11 by linear encoding, provided with a fault detection unit 12 in accordance with another embodiment. The fault detection unit 12 comprises a comparator 72 for comparing the random bits y generated by the generator 62 with the quantity zK calculated on the basis of the matrix operator K (71). If y≠zK (detection of a fault injected into the circuit), an alarm signal may be tripped.

Figure 8:
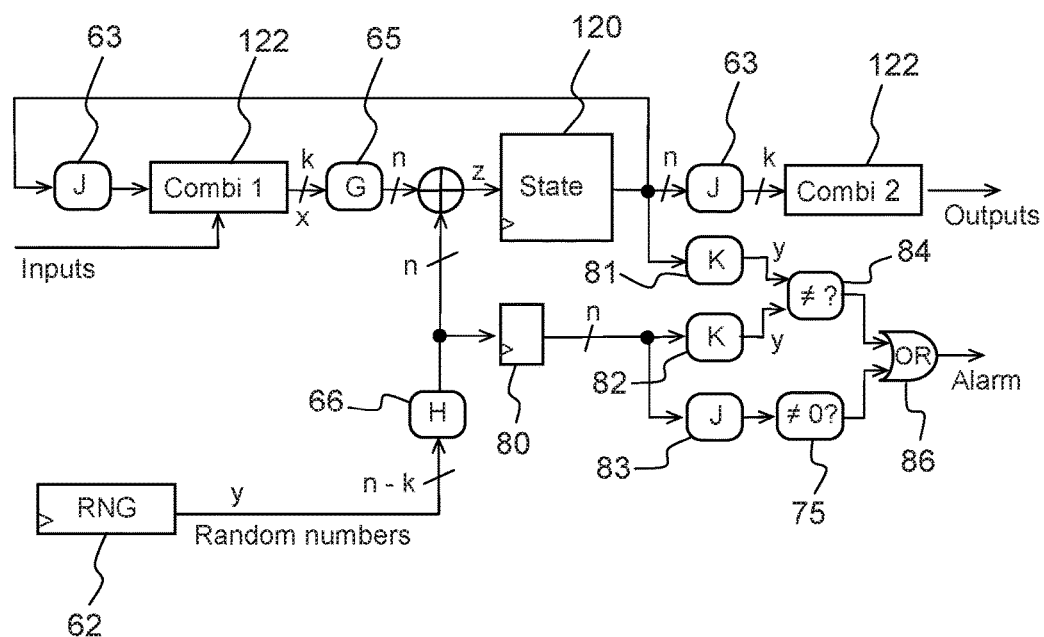
FIG. 8 represents a circuit protected by the protection system in accordance with a third embodiment with fault detection.

FIG. 8 shows a protection system 100 for protecting a circuit 11, the system comprising a fault detection unit in accordance with a variant embodiment.

FIG. 8 corresponds to the first embodiment in which the code E used to code the variable y (in addition to the initial coding by the code D) is chosen equal to the code D, while the supplementary code F of the code E is chosen equal to the binary code C (y'=yH). In this embodiment, the fault detector performs the tests zK=y'K and y'J=0.

The FIG. 8 protection system 100 enables the detection of a fault ε injected into the protected circuit by determining if a condition linking the Hamming weight $w_H(\varepsilon)$ to of the fault to the minimum distance $d_c$ and/or the dual distance $d_D$) is verified.

The fault may be a fault impacting on a protected variable z, the variable z then being modified to $z \oplus \varepsilon_z$, or a verification fault impacting on the encoded random bit vector yH (variable yH modified to yH $\oplus \varepsilon_{yH}$). A fault can then be detected if the Hamming weight $w_H(\varepsilon_z, \varepsilon_{yH})$ is strictly less than $\min\{d_c, d_D\}$.

In fact:
- either the verification fault $\varepsilon_{yH}=0$ and therefore $\varepsilon_z \in \ker(K)^* = C^*$ and consequently $w_H(\varepsilon_z) \geq d_C$,
- or the verification fault $\varepsilon_{yH} \neq 0$ and therefore $\varepsilon_{yH} \in \ker(J)^*$ and consequently $w_H(\varepsilon_{yH}) \geq d_D$.

A new resource 80 may then be added to store the mask from one clock period to the next.

Figure 9:
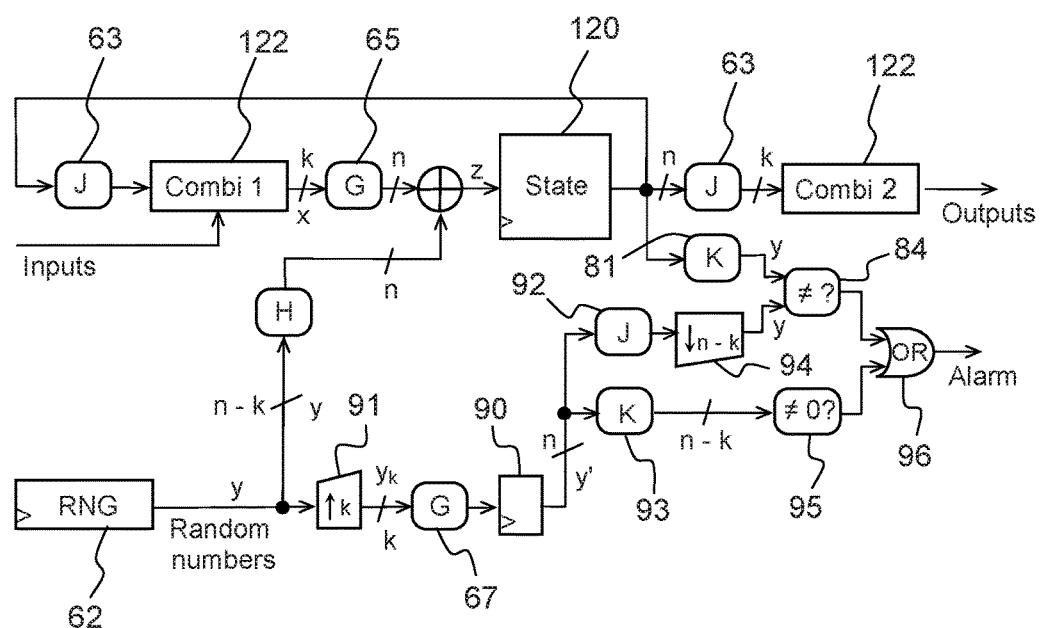
FIG. 9 represents a circuit protected by the protection system in accordance with a fourth embodiment with fault detection, verification being effected in another space.

FIG. 9 shows a protection system 100 in accordance with another embodiment for protecting a circuit 11.

FIG. 9 corresponds to the second embodiment in which the code E is taken equal to the binary code C while the supplementary code F of the code E is equal to the supplementary code D of the code C, the variable y on (n−k) bits being transformed into the variable $y_k$ on n bits and the encoded variable y' being of size n and equal to $y_k H$.

In this embodiment, the variable y is encoded by the matrix operator G (67) taking an input of size k that can be greater than or equal to n−k. The random numbers y are generated with a size (n−k) and then completed by a data padding operator 91 to form a vector $y_k$ of k bits containing y. The vector $y_k$ is then coded by the matrix operator G (67). To perform the test consisting in determining if y=zK, the coded value stored in 90 is read and then decoded by the matrix operator J (92). A decimation block 94 is used to produce a vector y' comprising (n−k) bits that will be compared with zK. Moreover, to complete the protection of the circuit against the execution of the payload of a Trojan horse, a second operation consisting in decoding the value contained in 90 by the matrix operator K (93) and then performing the comparison test with the null vector 95 is effected.

Figure 10:
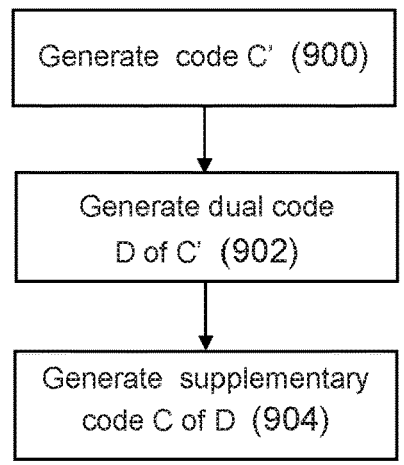
FIG. 10 is a flowchart representing the code generation method in accordance with certain embodiments.

FIG. 10 is a flowchart showing a method in accordance with one embodiment of generating the codes C and D (step 305 in FIG. 3).

The code generation method may comprise a preliminary step 900 consisting in determining a code C' having a dimension k and a minimum distance $d_C$, at least equal to $d_D^\perp$. It is always possible to determine such a code: in fact, it is equivalent to solving the problem $n_2(k, d)$ where $n_q(k, d)$ corresponds to the smallest integer n for which there exists on the Galois body $F_q$ a linear code of length n, of dimension k, and of minimum distance d. However, a satisfactory code would have a value of n and a value of $d_C$, as small as possible in each case: these two constraints are both linked, because the shorter a code, the smaller its minimum distance. Taking into account the Singleton limit, the following relation will be satisfied:

$$n \geq k + d_C - 1$$

To detect more faults, it is advantageously possible to choose n larger than the minimum value, which increases the fault detection probability. By way of simplification, it is assumed that it is possible to obtain C' of dimension exactly k and of minimum distance exactly $d_D^\perp$, which is frequently the case in practice. The code C' therefore has as parameters $[n, k, d_D^\perp]$.

The step 900 may be implemented using databases as described in Alexandre Duc, Stefan Dziembowski, and Sebastian Faust. Unifying Leakage Models: from Probing Attacks to Noisy Leakage. IACR Cryptology ePrint Archive, 2014:79, 2014 or constructive methods. The step 900 serves to prepare the construction of the dual code D because there is no suitable method for finding codes with a large dual distance.

In the step 902, the dual code C' is calculated. The dual code is denoted $D = C'^T$. D has as parameters a length n, a dimension (n−k), and a dual distance $d_D^\perp$ (equation 7). This code satisfies security property 1. Note that at this stage C' and D are not necessarily two supplementary vector spaces of the body $\mathbb{F}_2^n$.

In the step 904, D is completed using (n−k) vectors of the body $\mathbb{F}_2^n$ to generate the whole of the space $\mathbb{F}_2^n$ (of dimension $\dim(\mathbb{F}_2^n) = n$). The vector sub-space of $\mathbb{F}_2^n$ supplementary to D is denoted C, such that the following relation is verified:

$$C \oplus D = \mathbb{F}_2^n.$$

The parameters of C are [n, k]. In the embodiments in which the protection system 100 comprises a fault detection unit 12, the vector sub-space C may advantageously be chosen with a minimum distance $d_C$ greater than a predefined value (conforming to the coronary of property 2 whereby if an attacking system falsifies up to $d_C - 1$ lines of z, then it may be detected with a probability of 1).

Although the use of linear codes is of benefit in certain applications, the invention is not limited to the use of linear codes. As used here, a non-linear code (known as a non-restricted code) designates a subset that does not have a vector space structure. Other types of codes may be used, such as the $\mathbb{Z}_4$ linear codes, for example, which are generally not linear codes in $\mathbb{F}_2$. In the embodiments in which a non-linear code is used for encoding, the code generation method may then be limited to the steps 902 and 904, while the step 902 includes directly the search for a non-linear code D:

of length n,
of size $2^k$,
of dual distance $d_D^\perp$.

The matrices G, H, J and K may for example be determined as described in the following example in MAGMA pseudo-code (the annotations of the pseudo-code are marked //):

```
// Inputs:
k:=8; // Number of registers in the original non-protected circuit
d:=5; // Security parameter (dual distance of the code D)
// Algorithm for generating the matrices G, H, J and K:
Cprime:=BLLC(GF(2), k, d); // [n,k,d] of minimal n
n:=Length(Cprime);
D:=Dual(Cprime); // [n,n-k] of dual distance d
F:=UniverseCode(GF(2), n);
```

-continued

```
C:=ZeroCode(GF(2), n); // Supplementary of D
Dtmp:=D;
// Procedure for filling the code C
for i:= 1 to n do
   L:=LinearCode<GF(2), n | F.i>;
   if Dimension(Dtmp+L) gt Dimension(Dtmp) then
      Dtmp:=Dtmp+L;
      C:=C + L;
   end if;
end for;
if C+D ne F then error "C and D are not supplementary"; end if;
// Outputs:
G:=GeneratorMatrix(C);
H:=GeneratorMatrix(D);
J:=Submatrix(VerticalJoin(G,H)^-1, 1, 1, n, k);
K:=Submatrix(VerticalJoin(G,H)^-1, 1, k+1, n, n-k);
```

An example of code generation conforming to the FIG. 9 method is described hereinafter:

1. A code C' is determined in accordance with the step 900;
2. The supplementary code D is then determined as the dual code of C' ($D = C'^T$) in accordance with the step 902. The generator matrix H of D is written in a systematic form, with identity matrix on the right, as indicated below:

$H = (M \; I_{n-k})$, where M is a matrix of size $(n-k) \times k$ which calculates the control bits of H.

3. The code C is then defined by its generator matrix $G = (I_k \; 0_{(n-k) \times k})$. The square matrix $$\begin{pmatrix} G \\ H \end{pmatrix},$$

of size n×n, is a superior triangular matrix with only 1s on the diagonal. It is therefore reversible.

Note that it is possible to calculate the matrices J and K from G and H analytically:

$$\begin{pmatrix} G \\ H \end{pmatrix}^{-1} = \begin{pmatrix} I_k & 0_{k \times (n-k)} \\ M & I_{n-k} \end{pmatrix}^{-1} = \begin{pmatrix} I_k & 0_{k \times (n-k)} \\ M & I_{n-k} \end{pmatrix} = (J K) \quad \text{(equation 9)}$$

The second equality uses the fact in $\mathbb{F}_2$, −x=x. Note that like a matrix of type $0_{k \times (n-k)}$ does not induce the creation of any resource and a matrix of type $1_l$ consists in pulling l lines, the matrices G and H are hollow (with the exception of the part M). From equation (9), as the matrices $$J = \begin{pmatrix} I_k \\ M \end{pmatrix} \text{ and } K = \begin{pmatrix} 0_{k \times (n-k)} \\ I_{n-k} \end{pmatrix}$$

are obtained by grouping blocks of G and H, they are also hollow.

Note that the efficiency r=k/n of a code of minimum distance d can be proportional to k. Consequently, it is advantageous to perform the coding on a multitude of bits. Moreover, the gain in the minimum distance becomes increasingly marginal as k increases. Such minimum distances correspond to discrete mathematics where certain singularities may manifest for particular values of k so that they do not have an evolution continuous with the dimension of the code. It may notably happen that the constraint of the property 1 is reached both for a code with parameters [n, k] and for a code with parameters [n=2, k=2].

In certain embodiments, it may therefore be advantageous for reasons of implementation complexity to construct two matrices $$\left(\frac{k}{2}\right) \times \left(\frac{n}{2}\right)$$

rather than a single matrix of size k×n. In fact, the cost of implementing a matrix k×n is n log k while the cost of implementing a matrix $$\left(\frac{k}{2}\right) \times \left(\frac{n}{2}\right) \text{ is } \frac{n}{2}\log\frac{k}{2},$$

which is less than n log k.

Such an approach, i.e. construction of 2 matrices, may be applied to the matrices G and/or H and/or J and/or K:

for the matrix G of size k×n, the implementation cost of the matrix is n log k, which is greater than $$2 \times \left(\frac{n}{2}\log\frac{k}{2}\right);$$

for the matrix H of size (n−k)×n, the implementation cost of the matrix is n log(n−k), which is greater than $$2 \times \left(\frac{n}{2}\log\frac{(n-k)}{2}\right);$$

for the matrix J of size n×k, the implementation cost of the matrix is k log(n), which is greater than $$2 \times \left(\frac{k}{2}\log\frac{(n)}{2}\right);$$

for the matrix K of size n×(n−k), the implementation cost of the matrix is (n−k) log(n), which is greater than $$2 \times \left(\frac{(n-k)}{2}\log\frac{(n)}{2}\right);$$

The use of a plurality of codes with smaller dimensions to encode the state of the system makes it possible to reduce the implementation size without compromising the security requirement.

In the example of an attack by insertion of a malicious circuit of Trojan horse type, assuming that it had been activated by triggering it, the Trojan horse can direct its attack on any part of the circuit, such as, for example:
  variables that bear calculation data, such as cryptographic keys or sensitive data, i.e. data depending both on known variables and a key;
  variables that monitor the execution of the calculation (for example a turns counter).

The attack made by the Trojan horse aims to break the data, for example to perform fault injection (exploitable in certain contexts, such as in cryptography, for example). Another attack example may also be intended to corrupt the stream control graph of a program, for example to skip completely a cryptographic operation or to induce a hardware bug that may be exploited in software (the Trojan horse modifies a return address of a function if such a software activation condition has been detected).

The embodiments of the invention offer effective protection against such attacks in that they make it possible to protect a set of heterogeneous elementary variables in the same manner. In fact, the elementary variables are all potential targets for a hacker, whereas the classic approaches based on the individual protection of each variable are liable to omit certain variables potentially forming a target for a Trojan horse.

The embodiments of the invention may implement coding that applies dynamically and simultaneously to a large number of heterogeneous binary variables, which reduces the risk of omission of protection of a sensitive variable. Coverage is therefore guaranteed in the face of a payload type attack by a Trojan horse. A maximum level of security can be achieved if all the signals (for example, all the latches D) are coded. Similarly, the embodiments of the invention can prevent the proper triggering of Trojan horses.

Figure 11:
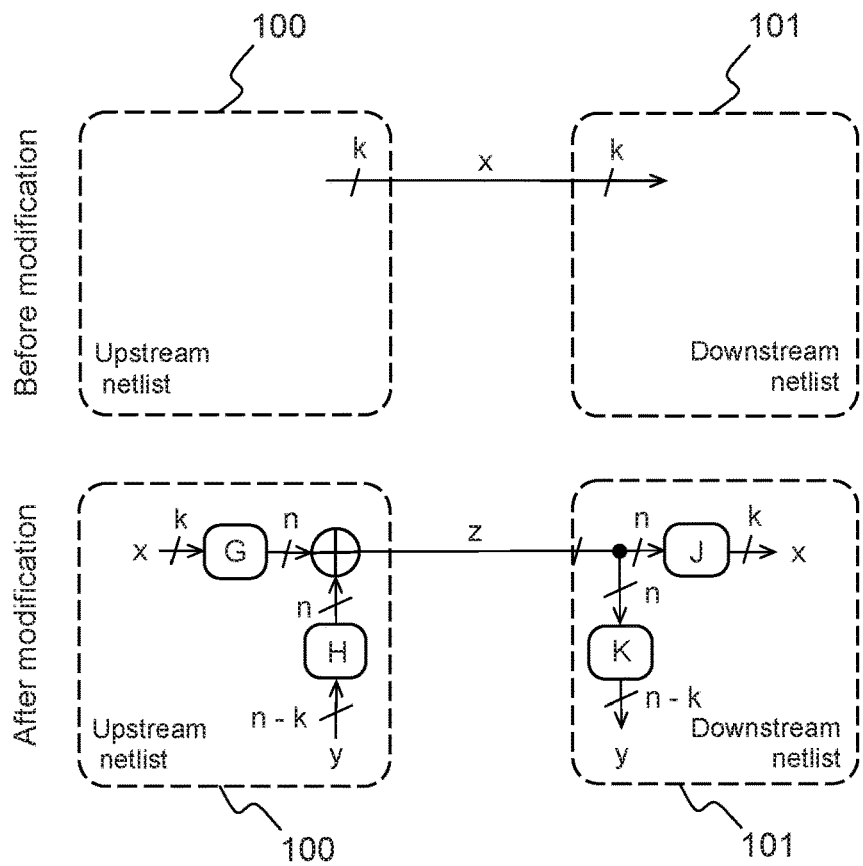
FIG. 11 shows the transformation of a circuit to protect a vector signal type variable by application of the protection method.

The variable x may be constructed from one or more types of elementary Boolean vectorial variables of the structural description of the circuit 11, which types of variables can include a variable associated with a line, with a sequential gate or with a combinational gate. For example, the variable x may be:
  1. A signal (vector of k lines)
  2. A set of k sequential gates (a DFF register of k bits)
  3. A vector of k combinational gates of type XOR FIG. 11 shows a vectorial variable x of vectorial signal type x, represented by k bits, and constructed from k elementary variables of signal type each represented by one bit. The part of the interconnection graph (netlist) that feeds the vectorial signal x is designated by the reference 100 (upstream netlist) whereas the part of the interconnection graph that receives as input the vectorial signal x is designated by the reference 101 (downstream netlist).

The circuit protection method modifies the structural description of the circuit so as to insert into the circuit, in the part 100 upstream of the signal x to be protected, circuit elements configured to replace an operation of writing on the signal x by an operation of writing on a variable z obtained by:
  1. coding the signal x by the code C with generator matrix G, and
  2. adding the mask y H using an exclusive-OR 103.

The original vectorial signal x is therefore replaced by a protected vectorial signal z equal to xG+yH. The number of bits used to represent xG, yH and z is from here on equal to the parameter n (length of the code), with n preferably greater than or equal to k.

The circuit protection method further modifies the structural description of the circuit so as to insert into the circuit, in the part 101 downstream of the signal x to be protected:
  circuit elements configured to replace an operation of reading on the signal x by an operation of reading z followed by decoding enabling recovery of the original vectorial signal x by applying the matrix J,
  circuit elements configured to implement an integrity verification on the random bit vector y, by passage of z into the matrix K; a fault on the variable z is detected if the vector y differs from zK.

Figure 12:
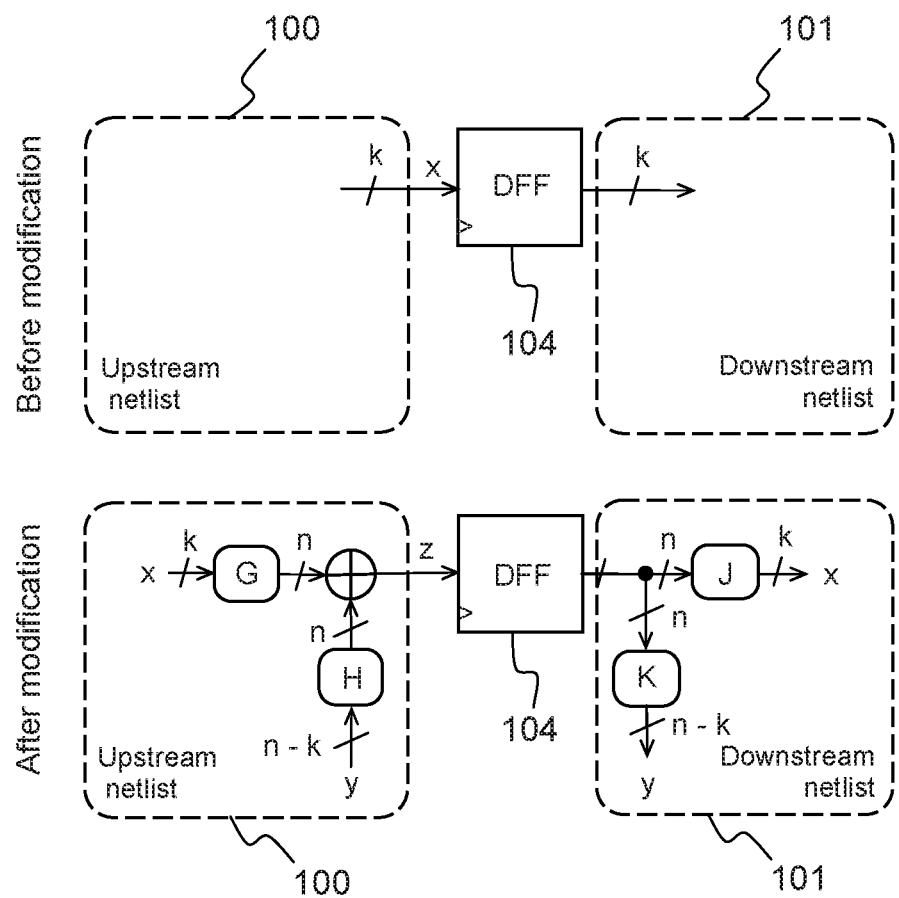
FIG. 12 shows the transformation of a circuit to protect a sequential logic gate type variable by application of the protection method.

FIG. 12 shows a similar example in which the variable x to be protected is a sequential logic gate constructed by storing k elementary variables of synchronous bit type (bank of k one-bit registers or DFF (Data Flip-Flips)).

This embodiment differs from that of FIG. 11 in that the modifications of the upstream part 100 are applied at the input of the DFF 104 whereas the modifications of the downstream part 101 are applied at the output of the DFF 104. During this transformation, the DFF of k bits becomes a DFF of n bits. If the initial state (after reinitialisation either on switch-on or because of the effect of a reset signal) of the original DFF 104 was $x_0$, then the initial state of the transformed DFF becomes $x_0$ G.

Figure 13:
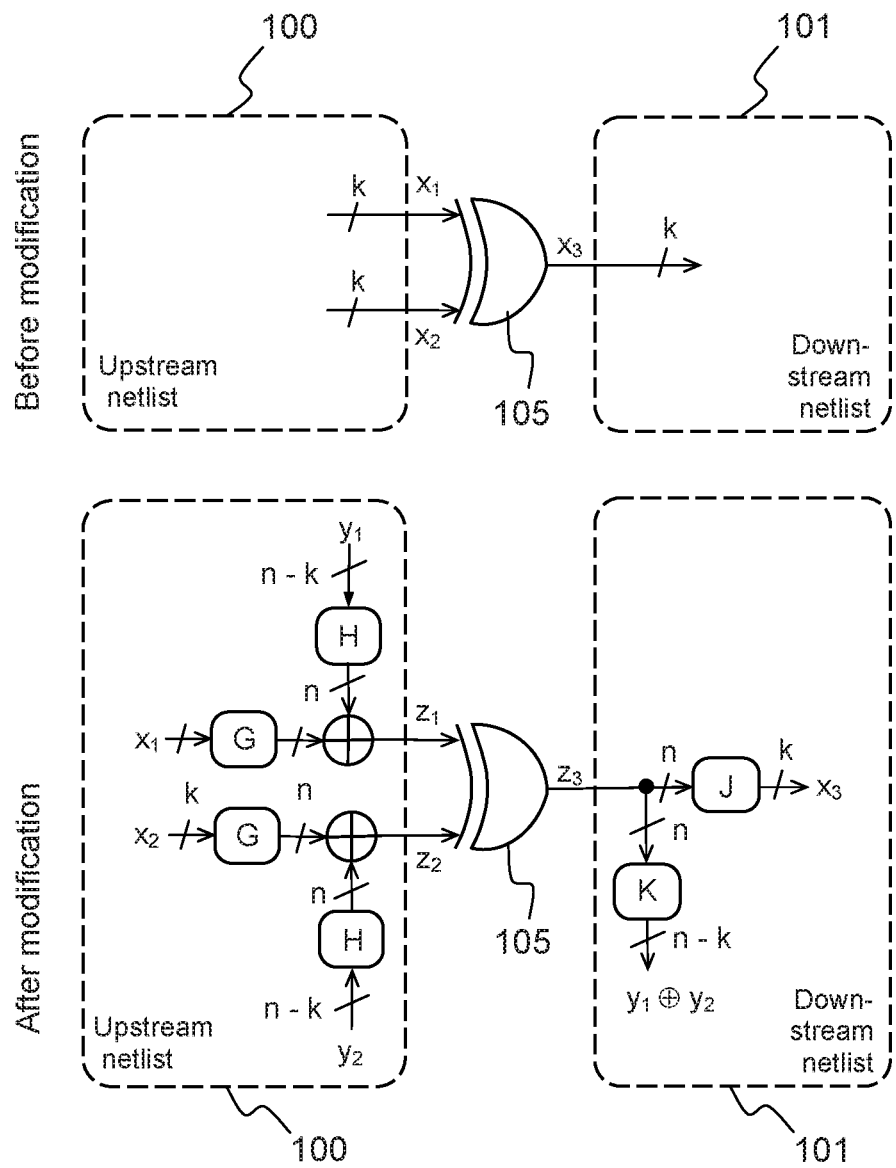
FIG. 13 shows the transformation of a circuit to protect a linear combinational gate type variable by application of the protection method.

FIG. 13 shows a linear combinational gate 105, such as exclusive-OR (XOR) gate with two vector inputs $x_1$ and $x_2$ of k bits and therefore an output $x_3$ of k bits represented by k bits. The protection method may be applied to one of the two input vector signals $x_1$ and $x_2$ or to the output vector signal $x_3$, as in the situation illustrated by the first figure. It is assumed that the same code C is chosen for the 2 inputs $x_1$ and $x_2$ and the output $x_3$ of the combinational gate 105. Each input of the XOR gate (considered individually as a variable x to be protected) is encoded with the generator matrix G of the code C. A different mask $y_1$H and $y_2$H is added. The two inputs $z_1$ and $z_2$ are therefore equal to $z_1=x_1G+y_1H$ and $z_2=x_2G+y_2H$. These two inputs are represented on n bits. Thanks to the linearity of the XOR gate, the output $x_3=x_1 \pm x_2$ may be obtained by applying the matrix J to the output $z_3=z_1 \pm z_2$. Following the Addition of $z_1$ and $z_2$, the two masks have also been added without this compromising security, because their distribution remains uniform. The result of $z_3$K is therefore $y_1+y_2$, which makes it possible to test the integrity of $z_3$.

It should be noted that it is equally possible to apply the protection method to a global variable $x_1$ constructed from k XOR gates with 2 inputs and one output.

It should also be noted that such transformations are compositional, which means that they may be applied (by recurrence) to structures more complex than a vector signal, a vector storage element, or a vector sequential gate.

Figure 14:
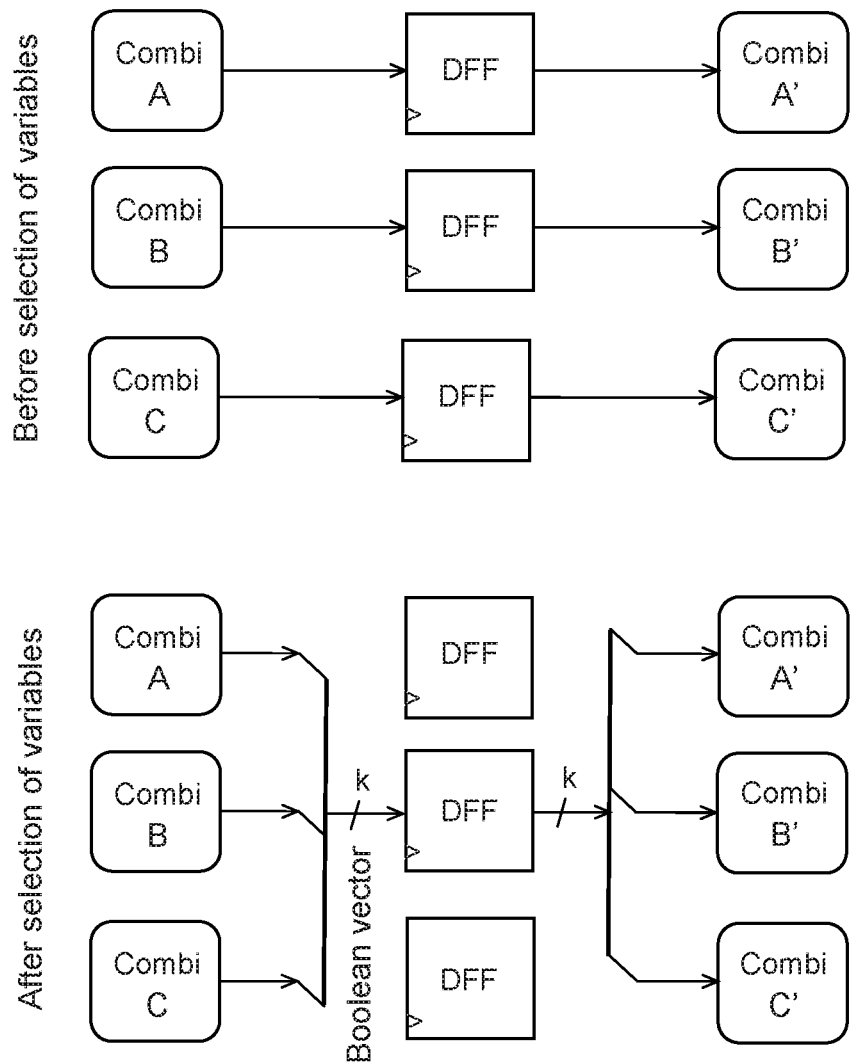
FIG. 14 represents an example of the construction of a vectorial Boolean variable from a circuit represented at the structural level.

FIG. 14 shows one example of construction of a vectorial Boolean variable from a circuit represented at the structural level (for example by an interconnection graph (netlist)). Three independent sub-components, designated A, B and C, feed three Boolean signals, which enter three independent latches (DFF) D. Each DFF produces an output Boolean signal which in turn feeds three independent components, called A', B' and C'.

The three DFFs process data with no relationship. Now, it is possible to consider them as an artificial sub-component, the inputs of which are the concatenated three outputs of the sub-components A, B and C and the outputs of which are the three concatenated inputs of the sub-components A', B' and C'. In this example, k is equal to three. The concatenated three variables are then represented as a bus of k bits, usually represented as in the lower part of FIG. 13 corresponding to the "after selection of variables" representation.

Figure 15:
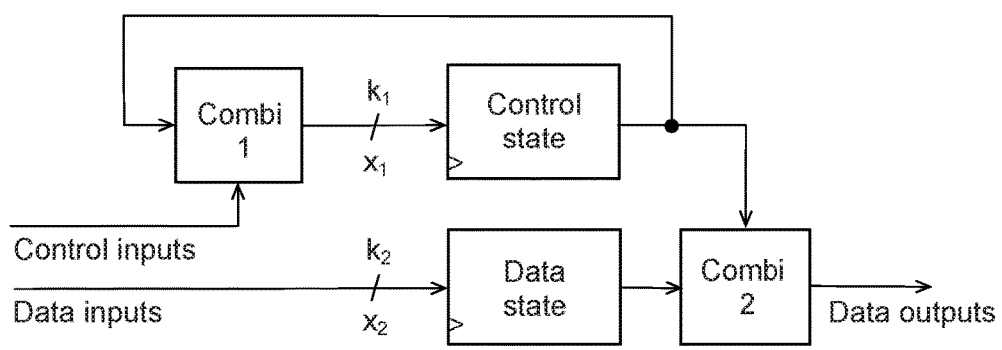
FIG. 15 represents an example of the construction of a global variable from signals having a heterogeneous semantic.

FIG. 15 shows another example of construction of a global variable x from heterogeneous semantic signals. This example corresponds more precisely to the representation of a processor (central processing unit (CPU)) comprising:

A control unit, which is controlled by control inputs x1 (such as a computer program, for example) and by a state evolution table 110. This table is encoded as a combinational logic block 111 (denoted Combi 1), which constitutes the finite state machine (FSM) of the processor CPU.

A data processing unit 112, which is represented as a pipeline, the data $x_2$ entering a register 113 and then being processed by a combinational block 113 (denoted Combi 2), also controlled by the control unit. The calculations are effected in the pipeline. The Combi 2 block may be considered as an arithmetic and logic unit (ALU), for example.

In the circuit described in this way at the structural level, there exist heterogeneous types of registers: the control register of the FSM, which is represented by a vector signal $x_1$ of $k_1$ bits, and the pipeline data register, which is represented by a vector signal $x_2$ of $k_2$ bits.

It is possible to concatenate these two signals, and even to interleave them (i.e. to mix bits of $x_1$ and bits of $x_2$) and to consider the new vector x of $k=k_1+k_2$ bits as the signal to be protected.

The circuit protection system and method in accordance with the various embodiments therefore make it possible to provide a high level of protection against Trojan horse type attacks.

The proposed protection systems and methods do not necessitate a knowledge of the meaning of the protected variables. They may even operate on concatenations of heterogeneous type elementary variables, as well as satisfying the security and functional non-regression objectives. Once the k elementary variables have been identified and the value of the security objects has been defined, the protection may be applied dynamically after transformation of the original structural description into another, protected structural description and compilation of the new structural description.

Basing the protection of the circuit on the structural description offers numerous advantages, including:
  the variables to be protected are concatenated into large bit vectors, the size of which is determined by the security objectives (dual or minimum distance of codes);
  the method is dynamic because it does not depend on the semantic of the circuit, which notably makes it possible to limit the costs of protecting the circuit;
  the global variables of k bits being obtained by concatenation of k binary signals in accordance with a chosen (for example arbitrary) order, the circuit once protected is obfuscated, which means that its functionality is more difficulty comprehensible given the interleaving of the signals effected by the application of the protection;
  finally, it is possible to produce long bit vectors, which favours obtaining satisfactory codes, a satisfactory code being a code that achieves or exceeds its objectives in terms of dual or minimum distance and which has a high efficiency (defined as the ratio between its length and its dimension in the case of linear codes).

The embodiments of the invention may be applied to any set of elementary Boolean variables, whatever the nature of those variables: the elementary variables to be protected are manipulated in blocks in the form of a heterogeneous vector of length k, where k may be as high as a few thousand bits.

The invention therefore favours the use of efficient codes (code of large dimension and/or length having long distances). It is not limited by the necessity of selecting and processing one after the other the multiple elementary variables to be protected taking account of their semantic, and therefore operates in accordance with a dynamic approach.

Another advantage of the invention is to code randomly (mask) sequential variables at the register outputs, not allowing direct identification of the information, whether to graft a Trojan horse or to observe leaks of sensitive variables by auxiliary channel analysis.

The protection method in accordance with the various embodiments may be combined with other classic methods of preventing Trojan horse insertion, such as placing all or part of the functionality in memory to be programmed after fabrication, the use of a dense placement, or gate structure (also known as netlist) obfuscation.

The logic gates of the countermeasure that circulate the random numbers can be mixed with the adjoining gates (by means of EDA tools, for example), which makes it possible to render complex the initial phase of an attack that consists in carrying out a functional reverse engineering of the circuit. The mixing in the same circuit of the combinational parts 122 of the circuit 11 and the parts added by the protection system 100 (for encoding and where applicable for fault detection) therefore concern the calculation parts on the data as much as checking the calculations, which is an additional advantage for rendering the description of the circuit 11 less easily intelligible.

The protection system 100 in accordance with the various embodiments may be used in numerous applications, such as, for example:

- to protect a circuit 11 against a Trojan horse, the random encoding of the state not making it possible to graft on the logic for the Trojan horse;
- to prevent reverse engineering, the function of the circuit being buried with the decoding/re-encoding logic;
- to protect against probing attacks, both front side and backside; probing attacks may be of point probing type or probing by noisy measurement of signals emanating from the component (threat also known as hidden channel analysis); the security parameter representing the number of probes to be placed for the successful extraction of a clear data bit may be the same as that used against Trojan horse insertion;
- to protect against SCA (Side-Channel Analysis), i.e. the study of information leaking via the band (such as by the current consumed, the field radiated, the time taken for the calculation, etc.) on the sequential variables, the protection of the variables preventing the construction of a leakage model;
- to protect against fault injection attacks by verification of the integrity of the die (fault detection), if the protection system 100 includes a detection unit 12.

The invention also enables masking regardless of the type of information, whatever type of control or data. Masking schemes essentially on the data can then exist.

A further advantage is to enable encoding and re-encoding on the combinational part of the circuit independently of the Boolean linearity properties of the logic.

Moreover, the logic of the sequential resource protection method may be mixed with the combinational resources, by simplification during logic synthesis using the synthesis (EDA) tools.

The masking method is entirely automatable, which is not the case with existing data masking methods. Moreover, the masking method is provable to verify the functional conformity of the coding.

The verification of the random numbers in accordance with certain embodiments constitutes a protection against fault injection attacks.

The codes used may notably be flexible codes. It is possible to use supplementary dual (SuD) codes to facilitate the verifications by orthogonal projection. Some cyclic codes have such an SuD property. For example, for a state on k=2163 bits, it is possible to find a code with parameters [n=4327; k=2163; d≥66]. It is nevertheless possible to use other, more efficient constructions (by looking for codes with given size and minimum distance, and minimising their length). Of course, the invention is not limited to codes of SuD type. Other types of codes may be used to loosen the constraints, to obtain a shorter coding length, and/or to enable choosing independently the security parameters such as $d_C$ (minimal distance of the chosen code C) and the minimal distance of the dual code $D^\perp$.

In particular, it may be advantageous to use non-linear codes to achieve a greater minimum distance for a given dimension and length.

A Trojan horse may be seen for example as a point probing station integrated into the component under attack. Now, such a station has difficulty in reading or writing more than about ten signals. As the Trojan horse is integrated, it can connect to a greater number of resources than an external station. The chosen security parameter can then be relatively large, for example of the order of 32 or 64 bits.

The detection unit 12 may equally serve to detect a Trojan horse inserted successfully.

The person skilled in the art will understand that the protection method in accordance with the various embodiments may be implemented in various ways by hardware, software, or a combination of hardware and software.

In particular, a software implementation of the protection method can be advantageously used to protect against cyber threats, i.e. memory disclosure and control flow hijacking following a data or code corruption (ie the corruption of memory). It should be noted that in a software implementation of the protection method, the memory may designates the whole memory hierarchy, which included registers, caches, and memory (RAM, SRAM, SDRAM, EEPROM, Flash, etc).

The invention is not limited to the embodiments described above by way of non-limiting example. It encompasses all the variant embodiments that could be envisaged by the person skilled in the art. In particular, the invention is not limited to the use of linear codes, the use of non-linear codes notably making it possible to achieve a greater minimum distance for a given dimension and length.

Further, it should be noted that the invention is not limited to the exemplary constructions of the binary code C and the supplementary code D given in MAGMA pseudo-code, for illustrative purpose. The codes C and D can be constructed according to different approaches such as for example by expanding codes on larger binary alphabets, i.e. on Galois fields $GF(2^m)$ where m is a positive integer, or by composing codes using the direct sum, the direct product, or the Plotkin sum. The codes C and D can be also constructed by deducing the codes from other codes using for example puncturing, shortening, or extending.

Moreover, the protection system 100 in accordance with the invention is not limited to a particular type of Boolean circuit 11. For example, the circuit 11 may be an ASIC, the protection system being usable to prevent the insertion of a Trojan horse in the foundry, or an FPGA circuit, the protection system being usable to prevent the insertion of a Trojan horse on bit stream compilation. The circuit 11 may equally correspond to a software program described by a binary code, the protection system being usable to prevent the insertion of a Trojan horse at compilation time or in the binary code. Just like the structural description of a circuit, a binary code is a succession of calculations on binary words. More generally, the invention relates to any type of Boolean circuit associated with a structural description describing a set of calculations on elementary Boolean variables represented by bits, whether:
in hardware, such as a circuit interconnecting elementary logic gates, for example, or
in software, such as a series of calculations on bit vectors, for example (typically bytes [k=8], words [k=16], double-words [k=32], quadruple-words [k=64], etc. that have variable sizes which have sizes of variables generally manipulated by processors).

The invention claimed is:

1. Method of protection of a Boolean circuit associated with a structural description of the circuit comprising elementary Boolean variables, each represented by one bit, the method comprising:
selecting a set of k elementary Boolean variables of the circuit as a function of predefined selection criteria,
constructing a variable x represented by k bits by concatenation of the k selected variables in accordance with a chosen order,
determining a binary code C comprising a set of code words and belonging to a given vector space and the supplementary code D of said binary code C as a function of a condition bearing on the dual distance of said supplementary code D, said binary code C having a length n and a size $2^k$, where k designates the number of bits representing said variable x;
substituting the variable x in the structural description of the Boolean circuit with a protected variable z represented by n bits so that:
any operation of writing on the variable x in the circuit is substituted with an operation of writing on the protected variable z, the protected variable z being generated by adding the variable x encoded by said code C to a random bit vector y encoded by the supplementary code D, and
any operation of reading the variable x in the circuit is substituted with an operation of reading the value of the protected variable z and an operation of decoding said read value of the protected variable z using a decoding matrix J of size (n×k) determined from the binary code C and the supplementary code D of the binary code C.

2. Circuit protection method according to claim 1, wherein the selecting said elementary Boolean variables comprises selecting the elementary Boolean variables with different uses.

3. Circuit protection method according to claim 1, wherein said binary code C is a linear code comprising a generator matrix G of size k×n used to code the state of said variable x in accordance with the relation xG and in that said supplementary code D comprises a generator matrix H of size (n−k)×n used to code the vector y of random bits in accordance with the relation yH, the matrix J used being determined from the generator matrix G of the binary code C and the generator matrix H of the supplementary code D.

4. Circuit protection method according to claim 1, comprising detecting a fault injected into the protected variable z by determining if a condition relating to the random bit vector is verified, said condition being verified if the random bit vector y is different from the read value of the protected variable z and decoded by a decoding matrix K of size n×(n−k), said matrix K being determined from the binary code C and the supplementary code D.

5. Circuit protection method according to claim 3, wherein the decoding matrix K is determined from the generator matrix G of the binary code C and the generator matrix H of the supplementary code D.

6. Circuit protection method according to claim 3, wherein the decoding matrix J and/or the decoding matrix K are determined from the relation:

$$(J K) = \binom{G}{H}^{-1},$$

in which G designates the generator matrix G of the binary code C and H designates the generator matrix of the supplementary code D.

7. Method according to claim 4, wherein the random bit vector y encoded by said supplementary code D is further encoded by a code E of dimension greater than or equal to n−k and producing words of size m, said code being associated with a decoding matrix M and an encoding matrix L, said code E being further associated with a supplementary code F having a decoding matrix N, corresponding to the control matrix of the code E, and an encoding matrix P, the random bit vector y being stored in a form y' corresponding to the encoding of the random bit vector by the code E.

8. Method according to claim 7, wherein the detecting a fault injected into the protected variable z comprises the verification of a condition relating to a fault test on the random bit vector y, said condition relating to the fault test being verified if the quantity zK, depending on the value of the protected variable z and the decoding matrix K, is different from the quantity y'M, where y' designates the random bit vector y encoded by the code E and M designates the decoding matrix associated with the code E.

9. Method according to claim 7, wherein the detecting a fault injected into the variable y' comprises the verification of a condition relating to the random bit vector y', said condition relating to the random bit vector y' being satisfied if the quantity y'N is different from zero.

10. Method according to claim 7, wherein said code E is equal to the supplementary code D of the binary code C and in that the supplementary code F of the code E is equal to the binary code C, the encoded variable y' then being of size n−k and equal to y·H.

11. Method according to claim 7, wherein the code E is equal to the binary code C and in that the supplementary code F of the code E is equal to the supplementary code D of the code C, the variable y of (n−k) bits being transformed into a variable $y_k$ of k bits and the encoded variable y' being of size n and equal to $y_k G$.

12. Circuit protection method according to claim 1, wherein the chosen code and said supplementary are generated beforehand in such a manner as to satisfy a principal security condition relating to the value of the dual distance of the supplementary code relative to a target value.

13. Circuit protection method according to claim 12, wherein the chosen code and said supplementary code are generated beforehand in such a manner as to satisfy a secondary security condition relating to the length n of the code C and/or to the minimum distance $d_C$ of the chosen code C.

14. Circuit protection method according to claim 12, wherein the chosen code and said supplementary code are generated beforehand in such a manner as to satisfy a secondary security condition relating to the quantity $$\frac{2^n - 2^k}{2^n - 1}.$$

15. Circuit protection system comprising a Boolean circuit associated with a structural description comprising elementary Boolean variables, each represented by one bit, said elementary variables comprising a set of k elementary Boolean vectorial variables preselected as a function of predefined selection criteria, the system comprising protection elements in the circuit configured to substitute a variable x represented by k bits and constructed by concatenation of the k preselected elementary variables in accordance with a chosen order with a protected variable z represented by n bits, said protection elements comprising:

circuit elements configured to replace any operation of writing on the variable x by an operation of writing on the protected variable z by addition of the variable x encoded by a predetermined binary code C, comprising a set of code words and belonging to a given vector space, to a random bit vector encoded by the supplementary code D of said binary code C, said code C having a length n and a size $2^k$, where k represents the number of bits representing said variable x, and circuit elements configured to replace any operation of reading on the variable x with an operation of reading the value of the protected variable z and an operation of decoding said read value of the protected variable z using a matrix J of size (n×k) determined from the binary code C and the supplementary code, the binary code C being predetermined as a function of a condition bearing on the dual distance of said supplementary code D.

* * * * *